(12) United States Patent
Costantino et al.

(10) Patent No.: US 10,083,391 B2
(45) Date of Patent: Sep. 25, 2018

(54) VISUALLY, OPTICALLY AND ELECTRONICALLY READABLE FRANGIBLE DEVICE FOR AFFIXATION TO THE SKIN

(71) Applicant: Cutaneous Information Technologies LLC, New York, NY (US)

(72) Inventors: Peter Costantino, Westport, CT (US); Michael Gilvary, New York, NY (US); Anthony H Handal, Westport, CT (US)

( * ) Notice: Subject to any disclaimer, the term of this patent is extended or adjusted under 35 U.S.C. 154(b) by 0 days.

(21) Appl. No.: 15/699,427

(22) Filed: Sep. 8, 2017

(65) Prior Publication Data

US 2017/0372187 A1    Dec. 28, 2017

Related U.S. Application Data

(63) Continuation-in-part of application No. 14/860,646, filed on Sep. 21, 2015, now Pat. No. 9,489,466, and
(Continued)

(30) Foreign Application Priority Data

Sep. 22, 2015   (WO) ................ PCT/US2015/051289
Jun. 29, 2017   (WO) ................ PCT/US2017/040053
Aug. 22, 2017   (WO) ................ PCT/US2017/048085

(51) Int. Cl.
*G06K 7/06*        (2006.01)
*G06K 19/077*      (2006.01)
(Continued)

(52) U.S. Cl.
CPC ... *G06K 19/07758* (2013.01); *G06K 7/10386* (2013.01); *G06K 7/1404* (2013.01)

(58) Field of Classification Search
CPC ............ G06K 7/06; G06K 7/10; G06K 19/00; G06K 19/06; G06K 15/00; G06F 17/00
USPC ......................... 235/441, 380, 487, 375, 488
See application file for complete search history.

(56) References Cited

U.S. PATENT DOCUMENTS 5,842,722 A * 12/1998 Carlson ................ B42D 15/00
                                                      283/107
6,569,280 B1 * 5/2003 Mehta ................... B42D 5/027
                                                      156/247
(Continued)

*Primary Examiner* — Edwyn Labaze
(74) *Attorney, Agent, or Firm* — Handal & Morofsky; Anthony Handal; Monami Roy

(57) ABSTRACT

A badge of the type comprising a substrate with a top side and a bottom side, an adhesive disposed on the bottom side for adhering the badge to a person, and a visually discernible material disposed on the top side for providing information, has a wireless device carrying first information secured directly or indirectly to said substrate. The visually discernible material comprises a first portion of visually discernible material and a second portion of visually discernible material. The first portion of visually discernible material is positioned, configured and dimensioned to communicate humanly perceptible and humanly readable second information. The second portion of visually discernible material carries third information encoded within the second portion of the visually discernible material and is positioned, configured and dimensioned to be scanned by an optical device in order to the read said third information encoded within the second portion of the visually discernible material. The substrate and/or said wireless device is frangible.

14 Claims, 46 Drawing Sheets

Related U.S. Application Data a continuation-in-part of application No. 14/862,033, filed on Sep. 22, 2015, now Pat. No. 9,519,724, and a continuation-in-part of application No. 14/862,081, filed on Sep. 22, 2015, now abandoned, and a continuation-in-part of application No. 15/295,144, filed on Oct. 17, 2016.

(60) Provisional application No. 62/426,765, filed on Nov. 28, 2016, provisional application No. 62/500,419, filed on May 2, 2017, provisional application No. 62/531,863, filed on Jul. 12, 2017.

(51) Int. Cl.
*G06K 7/10* (2006.01)
*G06K 7/14* (2006.01)

(56) References Cited

U.S. PATENT DOCUMENTS

| | | | | |
|---|---|---|---|---|
| 2006/0092028 | A1* | 5/2006 | Lerch | G06K 19/07381 340/572.8 |
| 2006/0131391 | A1* | 6/2006 | Penuela | G09F 3/005 235/380 |
| 2009/0205234 | A1* | 8/2009 | Hammerslag | G09F 3/005 40/633 |
| 2011/0140860 | A1* | 6/2011 | Lau | G06K 19/07749 340/10.1 |
| 2013/0043669 | A1* | 2/2013 | Hopman | B42D 15/00 283/67 |
| 2013/0049349 | A1* | 2/2013 | Feder | G06K 19/0776 283/75 |

\* cited by examiner

VISUALLY, OPTICALLY AND ELECTRONICALLY READABLE FRANGIBLE DEVICE FOR AFFIXATION TO THE SKIN

CROSS REFERENCE TO RELATED APPLICATIONS

This application is a continuation-in-part of International Application No. PCT/US2015/051289, entitled, Security and Accounting Infrastructure, and Associated Cutaneous Information Device and Method, filed on Sep. 22, 2015, which claims priority to U.S. Provisional Application No. 62/053,725, entitled, Temporary Cutaneous Information Device and Associated Method and Multi-Patient Treatment Infrastructure, filed on Sep. 22, 2014. This application also claims priority of International Application PCT/US2017/048085, entitled, Improved Visually, Optically and Electronically Readable Frangible Device for Affixation to the Skin, filed on Aug. 22, 2017, as well as applications International Application PCT/US2017/040053 System and Method for Transitions of Care, filed Jun. 29, 2017, U.S. patent application Ser. No. 14/860,646, Transportation and Resort Infrastructure, and Associated Cutaneous Information Device and Method, filed Sep. 21, 2015, U.S. patent application Ser. No. 14/862,033, Temporary Cutaneous Information Device and Associated Method and Multi-Patient Treatment Infrastructure and U.S. patent application Ser. No. 14/862,081 Temporary Cutaneous Information Device, Associated Method and Resort Infrastructure both filed on Sep. 22, 2015, U.S. Provisional Patent Application No. 62/242,973 Method and Apparatus for Manufacturing Cutaneous Information Devices, filed Oct. 16, 2015, U.S. Provisional Application No. 62/357,240 Transitions of Care Information Device, filed on Jun. 30, 2016, U.S. Provisional Application No. 62/359,104 Skin Applied Point of Service Preparation Device Process and Design Technical Field, filed on Jul. 6, 2016, U.S. Provisional Application No. 62/365,988 Method for the Biocompatible Skin Safe Application of Multiple Color Images to the Skin filed Jul. 23, 2016, U.S. Provisional Application No. 62/375,892 Method For Biocompatible Skin Safe Application of One or More Color Images To the Skin Using Sublimation Printing, filed Aug. 16, 2016, U.S. Provisional Patent Application No. 62/377,786 entitled Improved Visually, Optically and Electronically Readable Device for Durable Affixation to the Skin filed on Aug. 22, 2016, U.S. patent application Ser. No. 15/295,144 Method and Apparatus for Manufacturing Cutaneous Information Devices, filed Oct. 17, 2016, U.S. Provisional Patent Application No. 62/426,765 Method For Biocompatible Skin Safe Application of One or More Color Images To The Skin Using Thermal Printing, filed on Nov. 28, 2016, U.S. Provisional Patent Application No. 62/500, 419 Construct Design and Application of Cutaneous Information Device for Enhanced Physical Authentication Including a Streamlined Digital Authentication Process, filed May 2, 2017, U.S. Provisional Patent Application No. 62/531,863 Nontransferable Identification Device, filed Jul. 12, 2017, the disclosures of which are incorporated herein by reference.

TECHNICAL FIELD

The invention relates to badges particularly useful for secure identification and communicating with information technology infrastructure and methods for making the inventive badges.

STATEMENT REGARDING FEDERALLY SPONSORED RESEARCH OR DEVELOPMENT (Not applicable)

BACKGROUND OF THE INVENTION

U.S. Pat. No. 9,489,466 entitled Transportation and Resort Infrastructure, and Associated Cutaneous Information Device and Method discloses scannable and readable information devices which, in one embodiment, comprise an inherently frangible adhesive layer over which is deposited optically scannable and human readable information. That cutaneous information device ("CID") provides a high level of security because the frangibility of the CID, inherently causes it to wear away while also making it substantially impossible to transfer from one individual to another. Another embodiment incorporates wireless technology, more particularly, an RFD chip to provide additional functionality options. The skin applied identification device of the present invention is intended for use in systems such as those disclosed in U.S. Pat. No. 9,489,466.

SUMMARY OF THE INVENTION

The present invention addresses additional considerations associated with RFID incorporation into a CID (compared to systems solely for the presentation of human readable and optically scannable information). The present invention relates to mechanical securement of wireless subsystems, such as an RFID chip and the incorporation of its relatively large antenna structures. In this specification, the discussion will focus on an RFID system for the sake of clarity, but with the understanding that the invention may accommodate other electronic, electromagnetic and/or various wireless technologies.

In accordance with the present invention, a more mechanically robust (yet still frangible) securement system, particularly addressing the carrying of structures providing wireless capability while maintaining functionality for a desired period of time, is provided, but with a degree of frangibility which will, at same time, result in destructively disabling the CID in the event that an attempt is made to transfer the CID from one person to another, The inventive CID thus durably adheres to the skin to support 1) human readable information, 2) optically scannable data, such as Quick Response (QR), data matrix and/or bar codes, and 3) componentry enabling other wireless formats, such as RFD and Bluetooth®.

In accordance with the invention, a badge of the type comprising a substrate with a top side (top surface) and a bottom side (bottom surface), an adhesive disposed on the bottom side for adhering the badge to a person, and a visually discernible material disposed on the top side for providing information, has a wireless device carrying first information secured directly or indirectly to said substrate. The visually discernible material comprises a first portion of visually discernible material and a second portion of visually discernible material. The first portion of visually discernible material is positioned, configured and dimensioned to communicate humanly perceptible and humanly readable second information. The second portion of visually discernible material carries third information encoded within the second portion of the visually discernible material and is positioned, configured and dimensioned to be scanned by an optical device in order to the read said third information encoded within the second portion of the visually discernible material. The substrate and/or said wireless device is frangible.

The substrate and/or the wireless device may be frangible.

The wireless device may comprise an RFID device, the RFID device comprising a conductive member disposed on an RFID substrate. The RFID substrate defines perforations to promote frangiblity. Pairs of the perforations are disposed on opposite sides of the conductive member in facing relationship to each other whereby any attempt to remove the badge results in applying stress to that portion of the conductive member between facing perforations.

In accordance with the invention, frangiblility, upon the application of mechanical stress to the badge results in the badge breaking apart electrically, optically and mechanically.

The device may further comprise a frame member adhered over said top side, the frame member being robust enough to provide stiffness and support sufficient to reduce the likelihood of rupturing frangible portions of the badge.

The substrate may be thin enough to be frangible without perforations, and further comprise a frame member adhered over the top side, the frame member being robust enough to provide stiffness and support sufficient to reduce the likelihood of rupturing the substrate.

The adhesive may be a hydrocolloid adhesive.

A protective layer may be disposed over said topside.

The device may further comprise a windowed frame overlying the top surface, allowing the application of said visually discernible material after assembly of said device.

A plurality of badges may be contained on a single piece of substrate, and the operative badge portions of the device maybe kiss cut without cutting said substrate to allow removal of a badge while leaving the substrate behind after removal of said operative badge portions.

The inventive method contemplates assembling the operative elements of the device on a manufacturing assembly substrate which allows the operative elements of the device which are frangible to go through the manufacturing process substantially without damage, and wherein the manufacturing assembly substrate may be removed prior to use.

The inventive method further contemplates that assembly is performed by feeding to the manufacturing assembly substrate successive operative elements of the badge assembly from rolls comprising an operative element support strip adhered to a plurality of each of the operative elements, causing it to be adhered directly or indirectly to the manufacturing assembly substrate while peeling away the operative element support strip.

Inventive method further comprises that at least some of the operative elements of the badge assembly may be created using a process selected from the group comprising printing, silkscreening, brushing on, stamping and rollering on.

The substrate in combination with the adhesive may be substantially impermeable to water and the breathable allowing some water vapor to pass through said combination.

The invention also provides a system, comprising the above described badge together with a plurality of portable electronic communication devices for wirelessly reading the first information within the wireless device and/or optically scanning and reading the third information encoded by the second portion of visually discernible material. It is also contemplated that the inventive system may be adapted for receiving and transmitting user inputs from the users of said portable electronic communication devices. The system would also comprise a network for receiving the first and third information from the plurality of electronic devices. A computer is coupled to the network to receive the first information, the third information, and the user inputs. The computer includes non-volatile storage means having stored thereon computer software for controlling the computer and causing the computer to store the first information, the third information and the user inputs, to analyze the first information, the third information and the user inputs to generate database and control information, and to communicate the database and control information over the network to control electronic systems and/or make information available to users on the portable electronic communication devices.

The software controlling the computer is programmed in a manner which allows only portable electronic communication devices programmed to be access such information to the use of an approval code in an application downloaded to such portable electronic communication device. Different devices may be given different levels of access to information.

BRIEF DESCRIPTION OF THE DRAWINGS

The inventive badge and method will be understood from the following description taken in conjunction with the drawings, in which.

DETAILED DESCRIPTION OF THE PREFERRED EMBODIMENTS

Figure 1:
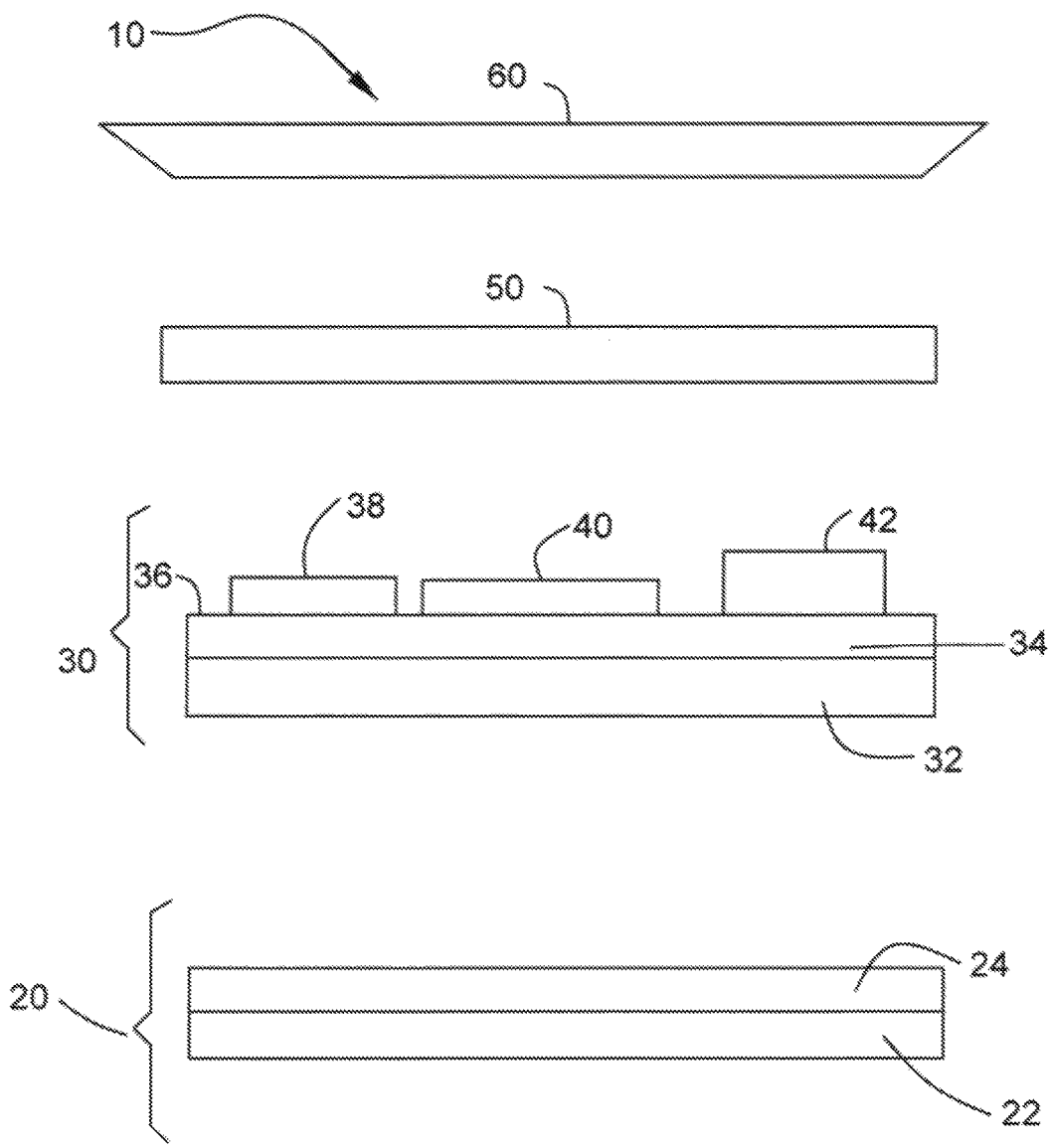
FIG. 1 is a diagrammatic exploded view of the device before application detailing the layers of the device.

Referring to FIG. 1, device 10 comprises of a plurality of layers which are adhered to each other to form a single unitary planar badge application assembly as more fully appears below. Device 10 comprises a planar layer 20 which serves as a carrier platform and the foundation upon which the operative portion of the inventive device 10 is carried. Layer 20 may comprise a thin sheet 22, made, for example, of paper and having a non-stick coating or release agent 24 applied to the upward facing side (the side against adhesive layer 32).

Figure 2:
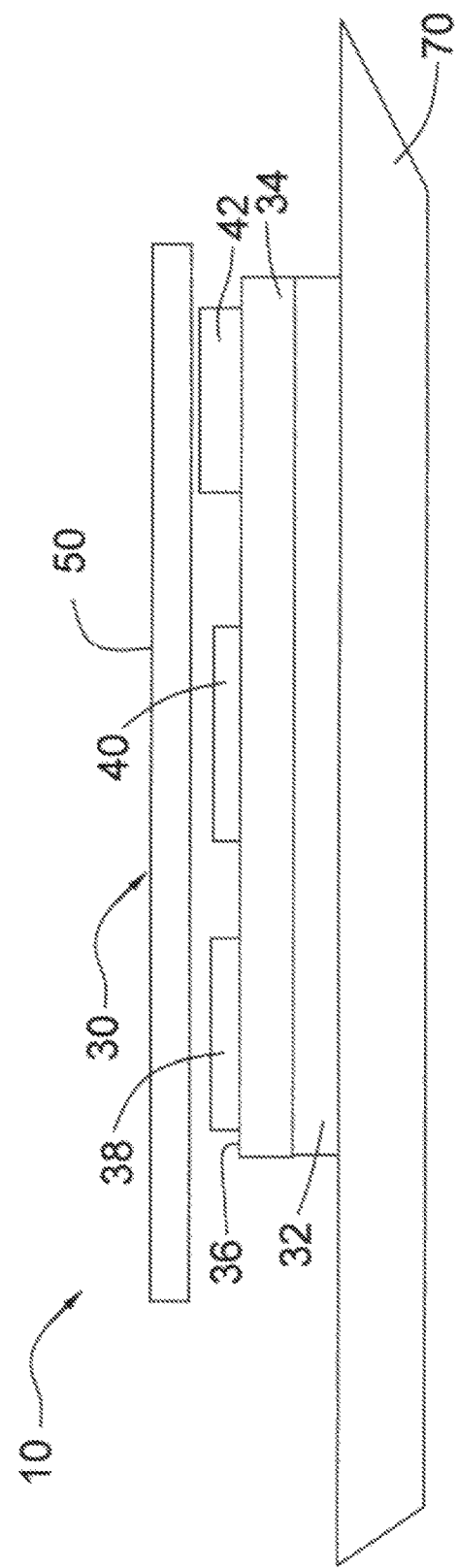
FIG. 2 shows a schematic cross-sectional view of the device applied to the skin.

Layer 30 comprises the operative portion of the device, comprising adhesive layer 32 and a substrate 34, together with human readable printed data 38, machine-readable printed data 40 and a wireless device, such as an RFID chip 42. An optional protective layer 50 may also be secured over printed data 38 and 40 and RFID chip 42. In accordance with the invention, a discardable frame support layer 60 is included to improve the rigidity of the structure. As noted above, the frame, optional protective layer, multilayer operative device portion 30 and release agent coded planar member 22 are all adhered to each other to form area had US more IS not limited to a single assembly. When it is desired to use the device, layer 20 which serves to protect the adhesive is removed, which is made possible by non-stick coating 24. Layer 20 is then discarded. The remaining portions of the device are then maintained rigid and easy to handle by frame 60 allowing the same to be then adhered to the skin 70 of a user, as illustrated in FIG. 2. After the device is secured to the skin of the user, frame layer 60 is discarded.

Adhesive 32 may be cyanoacrylate (CA), acrylic, silicone or a combination of these and/or other adhesives. In accordance with a particularly preferred embodiment of the invention, and adhesive comprising a hydrocolloid may be employed for its advantageous comfort, hypoallergenic and other properties. However, such hydrocolloid adhesives, in the context of the present invention, present unique fabrication and use challenges which have been addressed in accordance with the invention. A N-Butyl cyanoacrylate has been used medically since the 1970s and in 1998 was approved by the FDA and is now used as a medical adhesive. There are at least three cyanoacrylate compounds currently available as topical skin adhesives. 2-Octyl-cyanoacrylate is marketed as Dermabond and SurgiSeal. n-2-Butyl-cyanoacrylate is marketed as Histoacryl, Indermil, GluStitch, GluSeal, PeriAcryl, and LiquiBand. The compound 2-Ethyl-cyanoacrylate is available as Epiglu. Cyanoacrylates are skin safe, durable, water resistant, biocompatible and can be removed using an acetone solution.

Optically readable codes 40, disposed on the upper surface 36 of the substrate 34, may be a bar code, QR, datamatrix or any other visually machine read pattern or algorithm. Wireless device 42 may be any electronically readable device such as an electrical circuit, processor, resonant circuit, active or passive RFID device (optionally a nano-sized RFID chips), wireless communication devices (such as Bluetooth®), antennas, microchips, printed circuitry, printed battery, sensors or other printed or nano-printed electronics.

In accordance with a preferred embodiment of the invention, a passive RFID device 42 comprising a chip and printed circuit antenna are provided. Preferably, substrate 34 is no thicker than what is necessary to support adhesive 32 and informational components 38, 40 and 42 under normal wear and tear, but thin enough to be frangible upon the application of force during, for example, an attempt to remove device 30. T. The substrate is durable enough to withstand application to the skin in even harsh environments yet flexible and elastic enough to be comfortable on the skin. The adhesive 32 and the substrate 35 must also have the appropriate characteristics to handle moisture either from external sources or that naturally present on the skin, such as sweat.

To maximize reliability of, optionally printed, optical information components 38 and 40, substrate 34 may be white or have a color which contrasts with the printed information. Glow in the dark, fluorescent, etc. coloring may be advantageous depending upon conditions of use. W. As an alternative to having a white or colored material serving as a substrate 34, the printing process for applying printed information 38 and 40 they further comprise applying a white background pigment to the substrate to create contrast.

Visually readable data 38 and optically scannable layer 40 may be generated using skin safe dye, ink or toner. The same can be applied using any number of printing techniques including sublimation, thermal, laser or inkjet printing. These dyes can generate visual data which can include but not limited to identifying information, name, date of birth, ticket number, identification number, employee ID, prison inmate number, scout troop number, school precinct for class trips, advertising, an image of the person wearing the inventive device 30 and/or any other information which serves a functional, efficiency or security purpose. The present invention contemplates printing UV long wave and short wave dyes, fluorescent dyes, IR invisible dyes, light fast and non-lightfast dyes, glucose monitoring inks, and electrically conductive inks.

Information bearing members 38, 40 and 42 allow compatible reader to pull unique identifiers (optionally randomly generated codes) from device 30. When used with a data management system will allow identification, tracking or data manipulation. These codes can serve as a secure form of data communication allowing the reader to pull information from the skin worn device and also communicate back with the device. Given the prevalence of optical visual code readers, the interaction between these codes and the individual can serve any number of purposes for the wearer of the skin device and/or a third party reading the device. More particularly, it is contemplated that optically readable information on member 40 will be available to a wide variety of individuals, insofar as both Apple and Android smartphones have such capability. RFID functionality is locked on Apple smartphones but is available on android smartphones, and thus may represent information to be made available to only a limited number of individuals. Importantly, information availability, for example information stored on the information technology infrastructure of a hospital system or resort chain, may be limited depending upon the identity of the device querying the system. This also applies to RFID components 42, which may both store information and/or provide access to information stored on, for example, a hospital or resort information technology system.

In accordance with the invention, RFID is used as a secure form of data communication allowing the reader to pull information from the skin worn device and also communicate back with the device. Given the prevalence of near field RFID and Bluetooth readers, such as smart phones, tablets, watches and the like, the interaction between these technologies and the individual can serve any number of purposes for the wearer of the skin device and/or a third party reading the device. These devices may also be programmed to contain a variable rolling code which varies from time to time and thus increases the security and functionality of the device. This may be done by creating a counter within the chip that will prevent anyone from accessing or using the chip without the proper rolling code at that particular moment.

In accordance with the invention, RFID, similar and more robust devices (for example, a printed central processing unit) add a level of security and functionality over optically read codes. Such devices can store more information, be reprogrammed, and keeping a rolling count of the number of times the device was read. The rolling code in addition to counting can also dynamically change the information being displayed based on the count. Optionally, nano-sized RFID particles can be incorporated into the inventive identification device to confirm authenticity. In another embodiment, a flexible metal sheet would serve as the substrate layer and an RFID could be printed directly on the metal substrate. In a preferred embodiment, such an RFID would have a white layer deposited on it for reliable human readability and machine scanning of printed components.

Substrate 30 must be durable enough to withstand/tolerate printing despite its frangible nature, and preferably be impermeable to the dyes printed thereon. Substrate 30 should also have proper moisture vapor transition rates, channeling and other moisture handling properties to prevent body fluids, such as sweat, as well as the adhesive with data members 36, 38 and 40 or the integrity of the entire device.

Layer 50 is a protective coating layer, preferably transparent and is applied to the upper surface of device assembly 30, opposite the surface where the adhesive is applied. This protective coating will increase the durability, extend the useful life of the device and protect the components of layer 30 from the elements. At the same time, layer 50 may be of minimal thickness, and/or, optionally, be relatively brittle, thus not interfering with frangiblity, for example being a sprayed-on film forming material.

Layer 60 maintains the two-dimensional architecture of device layer 30 and optional protective member 50, preventing deformation and wrinkling Frame 60 can encompass all or part of the surface area of the inventive construct. Frame 60 also incorporates a window, as appears more fully below, by which printing, for example point of service printing, of variable data can take place (such as at the admission gate of an amusement park), such as printed information components 38 and 40.

During manufacture, a roll of substrate 20 is fed to a release agent applying station where release agent layer 24 is coated onto platform layer 22, to provide a first subassembly.

At the same time, a roll of material to be formed into the substrate is printed with human readable components 38 and machine-readable component 40. After printing, optionally, substrate 34 is provided with RFID componentry 42, such as an RFID chip and an RFID antenna coil which is electrically connected to the RFID chip to form the operative RFID circuitry. Next, optionally, a protective layer 50 may be applied over human readable components 38 and machine-readable component 40. Once the visual data, near field communication devices, microchips and processors are added to the device, a strip of frame material, previously die cut to define windows, and being fed from a roll is added to the construct. The role of sheet material from which the frames are made has been previously coated with an adhesive which goes into contact with protective layer 50. The substrate then proceeds to an adhesive applying station where a thin film of skin safe, biocompatible adhesive, such as a hydrocolloid adhesive layer 32 is applied to substrate 34, to complete a second subassembly. The first and second subassemblies are then joined to form a strip of devices suitable for application to the skin. The strip of devices 30 are then die cut to enable them to be used as individual devices 30.

In a preferred embodiment, device 30 is paid frangible by perforating the substrate. Thus, if removal is attempted the device will rip apart and be rendered nonfunctional and destroyed. In accordance with a preferred embodiment of the invention, substrate 34 is made of a material which will dissolve and acetone, and, accordingly, if removal is attempted with acetone the device will also be destroyed, resulting in the device being substantially nontransferable.

In one embodiment the geometric frame is transparent to allow visual confirmation of the orientation and data. In another embodiment the geometric frame is labeled to say "Remove last". In another embodiment the paper-thin carrier platform 22 displays the instructions "Remove first". In one embodiment, the resulting device 30 is dye cut after it is released from the purposefully designed printer device. In another embodiment device 30 is contained a single 8.5"× 11" sheet, allowing it to be customized with a, for example, laser, printer at the point of service such as the admission office of a hospital.

Before application, the skin is prepped with an antibacterial solution or alcohol to cleanse the application area. The skin area can also be prepped with a material like Mastesol™ that serves as a primer for the skin increasing the bond between the skin and the adhesive layer 32. Next, the medical professional will pull off carrier platform 22 with the release agent 24. This will expose adhesive 32. Adhesive 32 is then pressed against the skin 70 with reasonable force bonding. Finally, after adhesive 32 is sufficiently cured to secure device 32 skin 70, frame 60 is removed. Once the In an alternative embodiment, the visual data 38, optical data 40 and noncontact communication devices 42 is located below the substrate layer. These layers can be applied directly to the surface of the skin with the addition of another adhesive or are located between the adhesive layer 32 and the substrate layer 35. When in closer contact or direct contact with the skin the noncontact communication devices can be used to extract physiology data from the surface of the skin such as but not limited to temperature and glucose In accordance with the invention, a highly frangible embodiment of the invention may be provided by coating layer 24 with adhesive 32, such as hydrocolloid or adhesive, and then spraying the top surface of the adhesive in regions that are to receive printing with a thin layer of varnish similar material, for example a layer with a thickness of 1/10000 of an inch. In this embodiment the area printed elements 38 and 40 is provided with a foundation comprising a first layer of varnish which may then be printed with printed elements 38 and 40. The first layer of varnish may be relatively brittle insofar as it need only protect the appearance and not the integrity of the material forming printed elements 38 and 40. On the other hand, there is no varnish underlying RFID structure 42 which may simply adhere directly to adhesive layer 32. The assembly may then be provided with a protective layer and a frame 60 to provide rigidity after foundation 22 with its release agent 24 has been removed prior to application to the skin. Optionally, a second and relatively robust and flexible layer of varnish may be provided over the RFID antenna coil portion of RFID structure 42.

Figure 3:
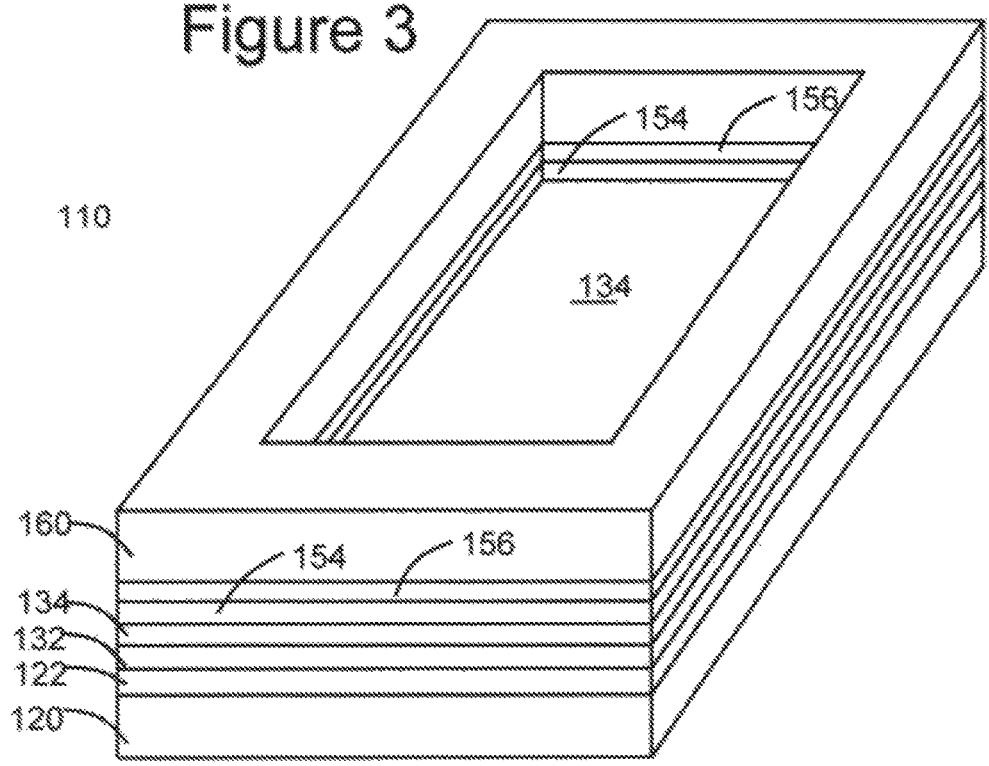
FIG. 3-10 is a schematic drawing of the device detailing various structures and the layers of the device before application.

Referring to FIG. 3, an alternative embodiment of a printable assembly 110 for creating and applying the inventive CID is illustrated. Assembly 110 comprises a carrier platform 120 made of, for example, paper, for example with qualities similar to that used as a base in a conventional sticker. Carrier platform 120 is coated with a layer of a release agent 122, for example wax, mylar, silicone, metal foil, or other plastic having the characteristic of not being dissolved by the adhesive employed in assembly 110 as appears more fully below.

An adhesive layer 132 overlies layer of release agent 122. In accordance with one preferred embodiment of the invention, adhesive layer 132 is made of cyanoacrylate adhesive in the uncured state. The cyanoacrylate adhesive is selected for its very low viscosity in the uncured state. As is typical of such adhesives, when cyanoacrylate adhesive dries and cures it is substantially rigid. Alternatively, hydrocolloids may be employed for their moisture handling and anti-inflammation properties. Hydrocolloid adhesives are particularly preferred for their comfort and reliability. Still another possibility is to use silicone adhesives which may be selected for their ability to be applied and removed with minimal irritation to the skin. Yet another alternative is an acrylic adhesive which might be selected for strong adhesion properties. In accordance with the preferred embodiment, the appropriate adhesive or combination thereof to form adhesive layer 132 would depend upon the application, and such factors as desired identification badge life, comfort, environmental temperature, environmental humidity and moisture, and so forth.

A printable substrate 134 is flexible, durable, elastic, comfortable on the skin, frangible and suitable for receiving ink in a variety of printing processes, such as sublimation printing, laser printing, xerographic printing, inkjet printing, impact printing using a ribbon similar to an electromechanical typewriter, or conventional offset or other conventional printing process. Substrate 134 is of low strength, or perforated and will break apart if subjected to relatively low magnitude mechanical stresses or impacts in any direction. In this application this characteristic is referred to as frangibility. Insofar as substrate 134 is the base for the applied inventive CID after application, its frangibility makes it substantially impossible to remove, thus adding a measure of security to the device as an identification device. More particularly, frangibility makes it substantially impossible for the device to be moved from one person or thing to another, or, put more broadly, the device is not transferable from one surface to another surface.

The perimeter of substrate 134 is covered with a release agent 154. That portion of surface 134 which is within the opening defined by support frame 160 may optionally be treated with a varnish, corona, or other such treatment to enhance its ability to receive print, for example enhancing its performance when used with desktop printing systems. Carrier platform 120 and release agent 122 are secured to each other. Insofar as use of assembly 110 contemplates the removal of carrier platform 120 and release agent 122 by peeling to expose adhesive layer 132, the remaining layers are exceptionally thin. Accordingly, a grasping frame 160 is held by adhesive 156 to substrate layer 134. Grasping frame 160 allows assembly 110 to be held easily after carrier platform 120 has been removed exposing the adhesive and allowing attachment of the remainder of assembly 110 to be adhered to the skin of, for example, a patient in a hospital.

In accordance with the present invention, the top surface of substrate layer 134 may be preprinted with information, such as the name of a resort, or amusement park. In addition, an identification number can be preprinted, also prior to the assembly of the inventive device. The preprinted identification number, for example in the form of a barcode, can then be scanned at the entrance to the amusement park or other facility and the scan number associated with a particular patron at that point.

The assembly shown in FIG. 3 is packaged in an air impervious and preferably vacuum sealed envelope made of a material which will not dissolve in the adhesive, such as the above examples of adhesives. The envelope may be made, for example, of foil sealed at the edges with a highly impervious glue. In the case of cyanoacrylate adhesive, the objective is to maintain adhesive 132 in the uncured very liquid low viscosity state.

Figure 4:
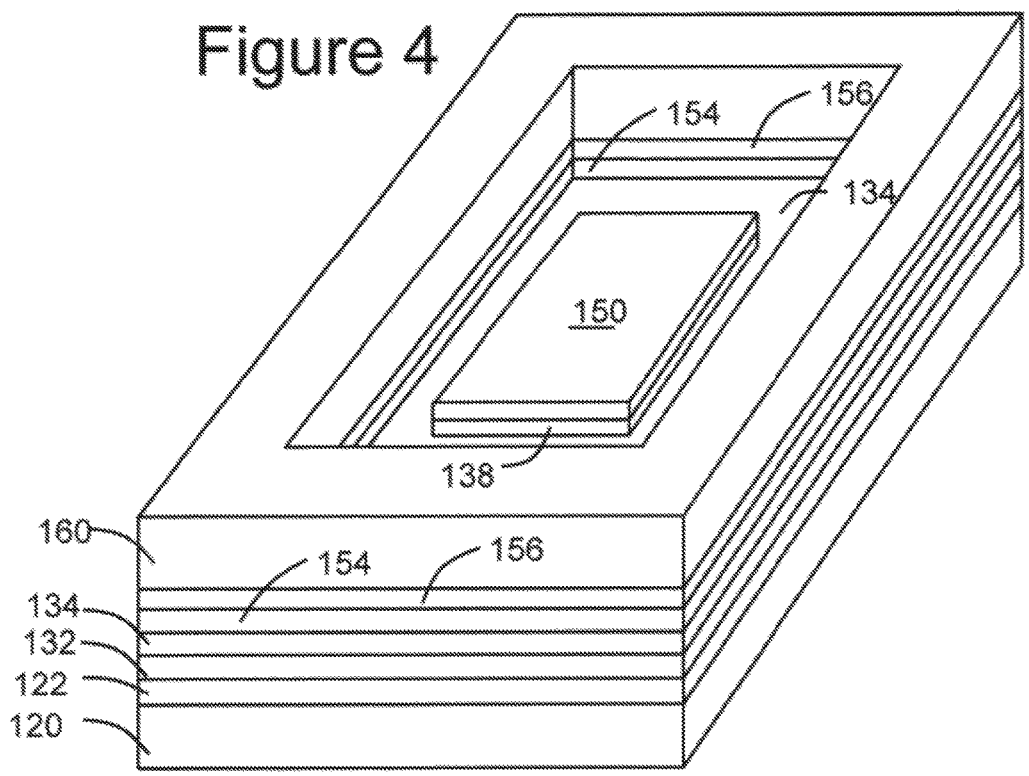

As may be understood from FIG. 4, in use, assembly 110 (illustrated in FIG. 3) is put into a laser, offset or other printer and the informational portion of a cutaneous information device in the form of a visually readable image 138, formed of dye, ink or toner, is printed. At the same time, an optically readable image, such as a barcode 140 may also be printed. Finally, and optionally, an RFID or other machine readable device 142 is applied to substrate 134. As a result of the printing process, a finished assembly 110, as illustrated in FIG. 4, is produced.

Device 142 may be a conventional RFID device which may be glued to substrate 134. Alternatively, device 142 may comprise material deposited during the printing operation and having a machine-readable configuration and material, such as gold-leaf. Such devices are known in a wide variety of configurations substantially all of which may be used and/or adapted to the present invention.

Additionally, the RFID device may be programmed during the printing/fabrication process.

Optionally, a protective layer 150 may be added to the device, for example by spraying, painting, or by deposits of a clear protective layer of, for example, dye or toner, in a sublimation or laser printing operation.

After devices 138, 140 and 142 have been placed in position and, optionally, covered with a protective layer 150, for example at the receiving room in a hospital in order to make a cutaneous information device to be applied to a patient's skin, the nurse or other health professional peels carrier platform 120 with its adhered layer of release agent 122. This exposes cyanoacrylate adhesive 132.

The adhesive 132 can have a very low viscosity, allowing carrier platform 120 with its release agent coating 222 to be removed with minimal damage to frangible substrate 234.

All layers of the inventive assembly 110 (with the exception of carrier platform 120 and frame 160) are very thin and flimsy and are difficult to handle on their own. Because frame 160 is substantial, for example, made of paper, assembly 110 may be grasped, positioned and otherwise handled as necessary even after carrier platform 120 with its adhered layer of release agent 122 have been removed.

Accordingly, the user adheres the remaining portions of the assembly 110 to the skin of the user. Frame 160 with release agent coating 156 is then removed, leaving behind a frangible cutaneous security and information device comprising skin safe adhesive 132, all or a portion of skin safe substrate 134, identification members 138, 140 and 142, and, optionally, protective layer 150.

Figure 5:
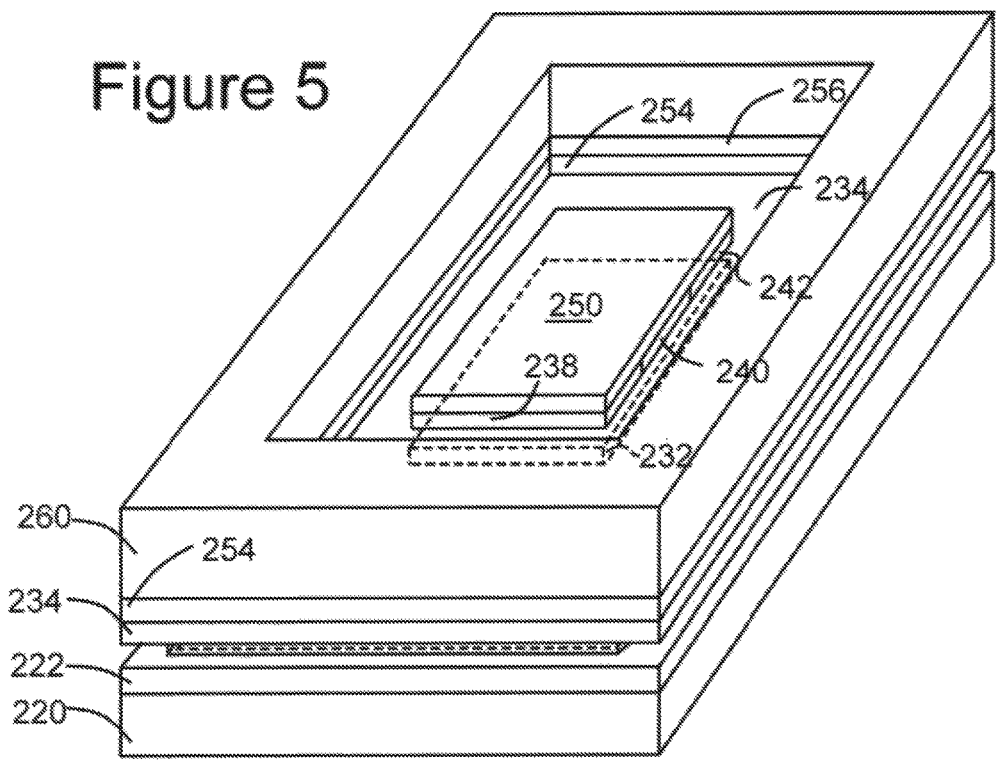

Referring to FIG. 5, an alternative embodiment of the inventive CID forming assembly 210 is illustrated. Assembly 210 includes a carrier platform 220 coated with a release agent 222, and a quantity of adhesive 223 which has been allowed to dry and solidify. Adhesive 223 is deposited in a rectangle shaped band around the perimeter of release agent layer 222. Adhesive 223 is used to secure carrier platform 220 and release agent layer 222 to substrate 234 which is made of a very thin and/or frangible material suitable for printing using a laser, inkjet, sublimation or other printer. Substrate 234 may be treated to have a coating which improves its ability to receive toner, pigment, ink or the like.

The underside of substrate 234 has deposited thereon, a patch of, for example, cyanoacrylate, adhesive 232 which is in the uncured, undried, fluid and very non-viscous state. In the case of a CID employing cyanoacrylate, when the structure suitable for printing has been completed, it is quickly packaged in a sealed envelope to prevent adhesive layer 232 from drying, curing and becoming rigid.

Adhesives may be deposited in the making of the identification structures of the present invention by numerous means including spraying, application by rollers, application with brushes, or transfer from a release agent coated carrier sheet holding a layer of adhesive to structural parts of the inventive identification device, followed by removal of the release agent coated carrier sheet.

Substrate 234 is secured to the release layer 254 on paper frame 260 by a cured, dried and rigid adhesive (not illustrated). The above-described structure may then be introduced into a printer and visually identifiable device 238, such as an image of a patient, machine-readable device 240 and, for example, RFID device 242. Optionally, a protective layer 250 may be deposited and made of, for example, clear material which has been roller printed, offset printed, sprayed, or otherwise applied.

Following fabrication of the assembly shown in FIG. 5, carrier platform 220 and release agent 222 are peeled off. At this point, frame 260 provides rigidity for the device allowing it to be handled. Adhesive 223 prevents shifting of components of assembly 210 during printing. The adhesive 223 is selected for easy separation after printing. Even after removal of carrier platform 220, the remaining parts of the device remain rigid and easy to handle on account of the handling and rigidity properties provided by frame 260.

Figure 6:
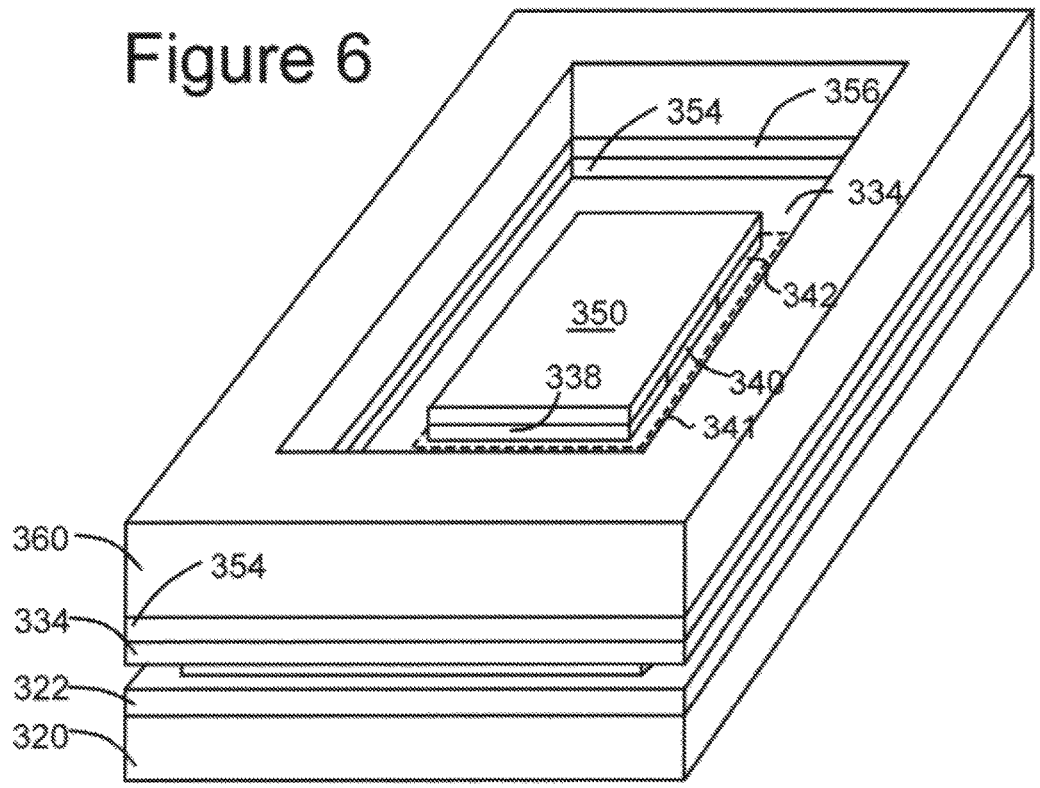

Turning to FIG. 6 (where corresponding, analogous or somewhat analogous parts are given numerals multiples of 100 different from their corresponding parts in earlier embodiments, where practical, a convention followed to varying extents throughout this application), an alternative embodiment 310 of the present invention is illustrated. The embodiment illustrated in FIG. 6 is substantially identical to the embodiment illustrated in FIG. 5, except that perforations 341 are cut into substrate 334 to provide for removal of those parts of substrate 334 which do not have adhesive underneath them.

Figure 7:
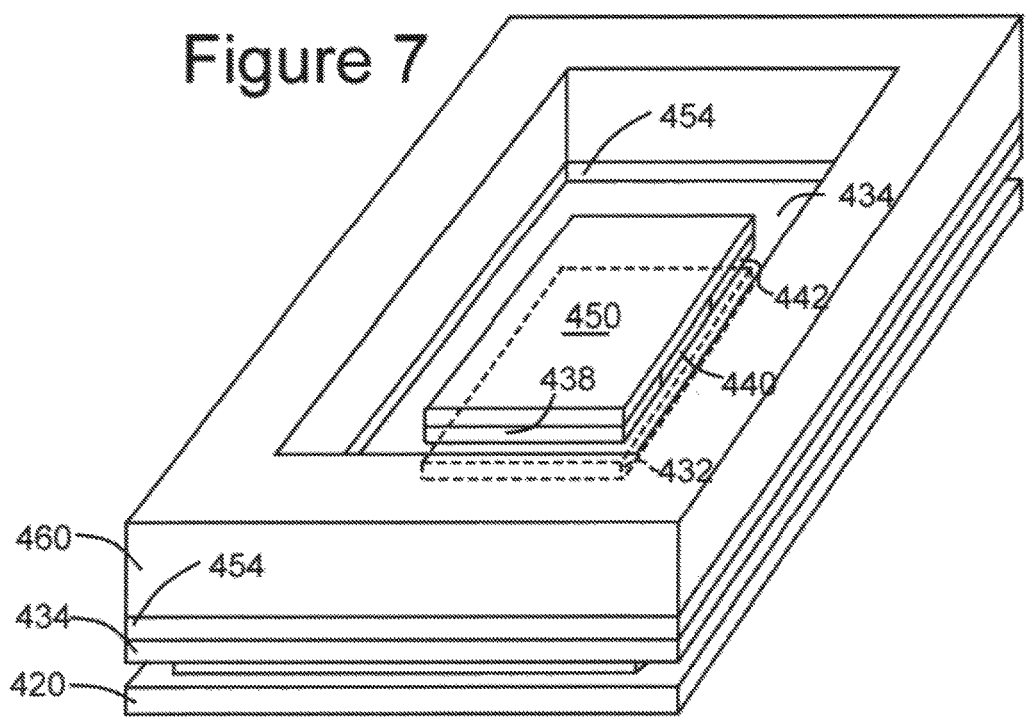

Turning to FIG. 7, still yet another alternative embodiment 410 of the present invention is illustrated. In this embodiment, frame 460 is glued directly to substrate 434 by glue 454. Accordingly, when carrier platform 420 with release layer coating (not illustrated) thereon is removed, this exposes adhesive patch 432. The remaining assembly is then pressed against the skin for a period of time sufficient for adhesive 432 to cure sufficiently to hold identification elements 438, 440 and 442 (with their optional coating 450) in place. Frame 460 may then be pulled off. The same may be promoted through the use of optional perforations similar to perforations 341 in FIG. 6.

Figure 8:
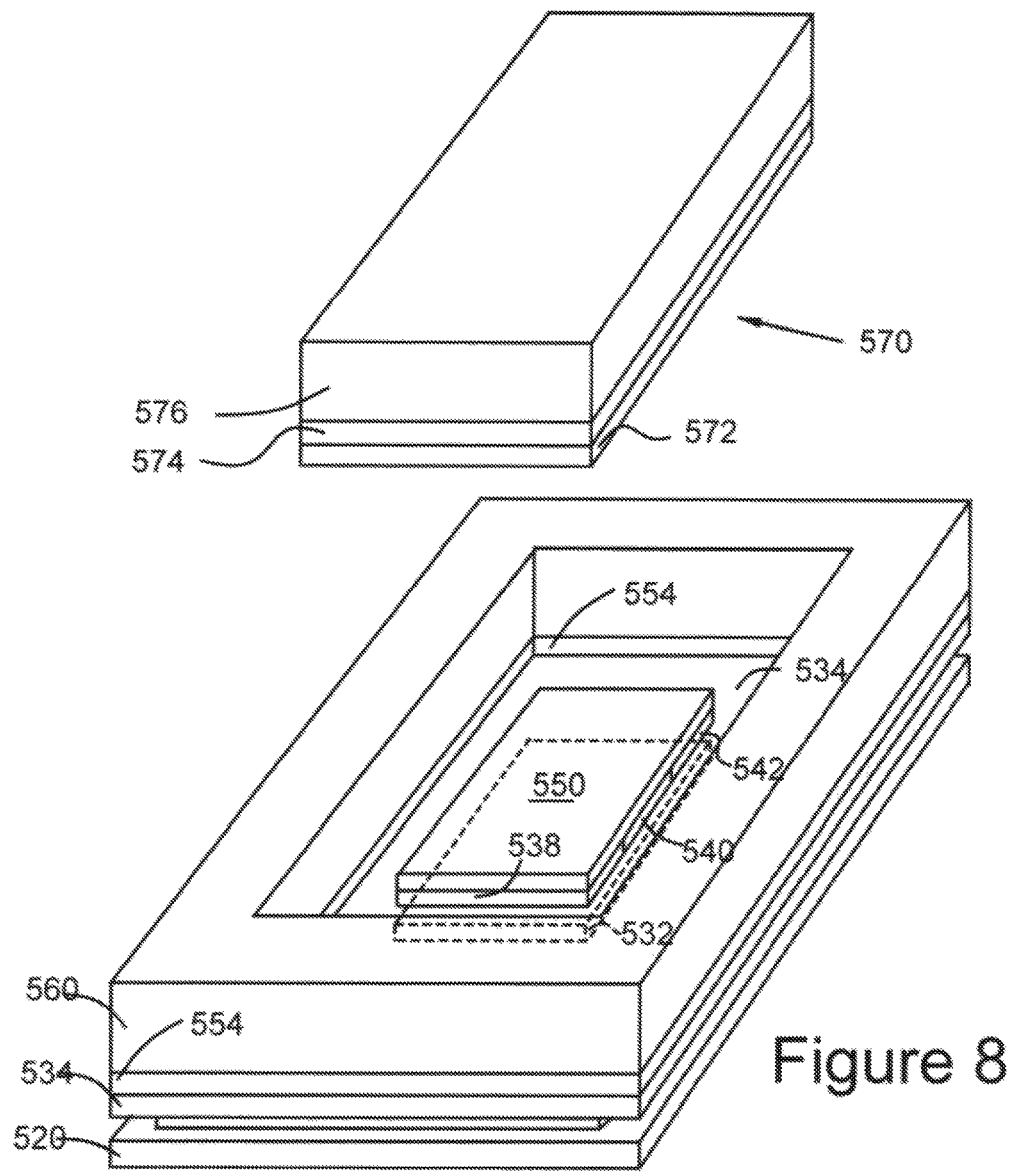

FIG. 8 shows yet another alternative embodiment of the present invention. In this embodiment, the structure of lower assembly 510 is substantially identical to the structure of assembly 410 in FIG. 5. Likewise, it receives its CID elements 538, 540 and 542 on substrate 534 in similar fashion. However, in addition, a protective member 570 is provided. Member 570 is of the same construction as conventional tattoo-making paper comprising an adhesive layer 572 a release layer made of, for example, a water-soluble glue 574, and a water absorbent backer paper 576.

Figure 9:
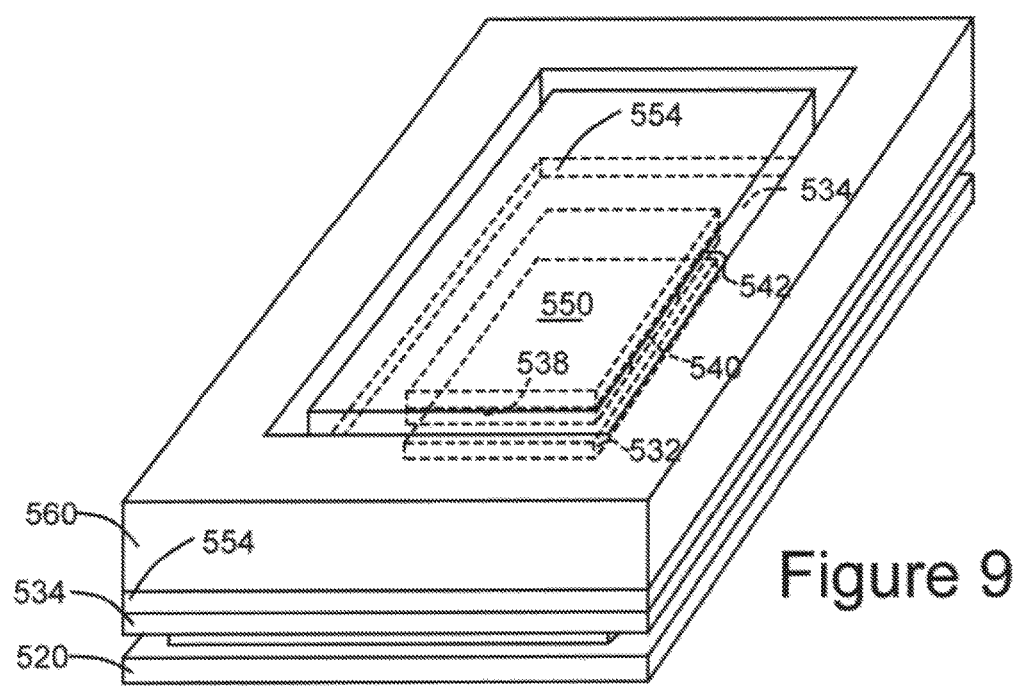

In accordance with the embodiment of FIG. 8, after the CID formed by substrate 534, information devices 538, 540 and 542, and optional protective layer 550, protective member 570 is placed over protective layer 550 adhering stiff paper 576 layer to the CID, and reinforcing its strength, as illustrated in FIG. 9. More particularly, the fragility and frangibility of substrate 534 is contemplated to be substantially greater than those properties of, for example, substrate 234. One might expect the removal of carrier platform 520 to damage such a delicate substrate 534. However, because substrate 534 is mechanically reinforced by stiff paper layer 576, substrate 534 is protected from damage.

After carrier platform 520 has been removed, the assembly is pressed against the skin causing uncured adhesive 532 to bear against the skin, be cured, harden and securely hold the CID to the skin. It then becomes necessary to remove stiff paper layer 576. This may be done by wetting paper layer 576, causing water to migrate into water-soluble adhesive 574 causing it to turn to a low viscosity fluid, allowing stiff paper layer 576 to be removed.

Figure 10:
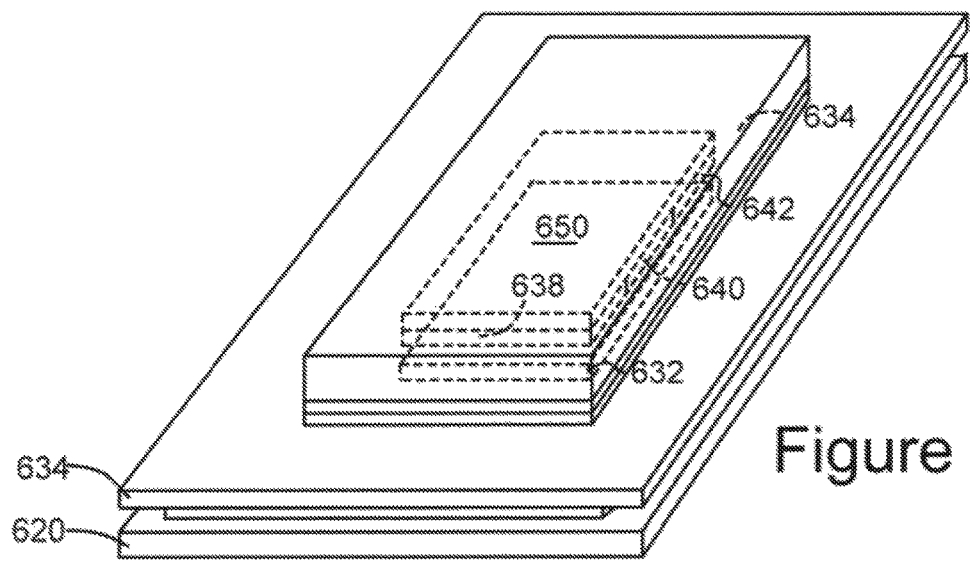

FIG. 10 shows yet another embodiment of the assembly 610 of the present invention essentially identical to the embodiment of FIGS. 8 and 9, except that there is no frame member 560. It is noted that in FIG. 10 the primary support members are support platform 620 and paper layer 676, for example having a thickness on the order of that of 20 pound paper. In contrast, the CID layers, adhesive layers, release agent layers and the like are very thin, perhaps on the order of 1-5 mils or less. In all of the embodiments of the invention illustrated herein, sizes have been exaggerated for purposes of clarity of illustration.

Figure 11:
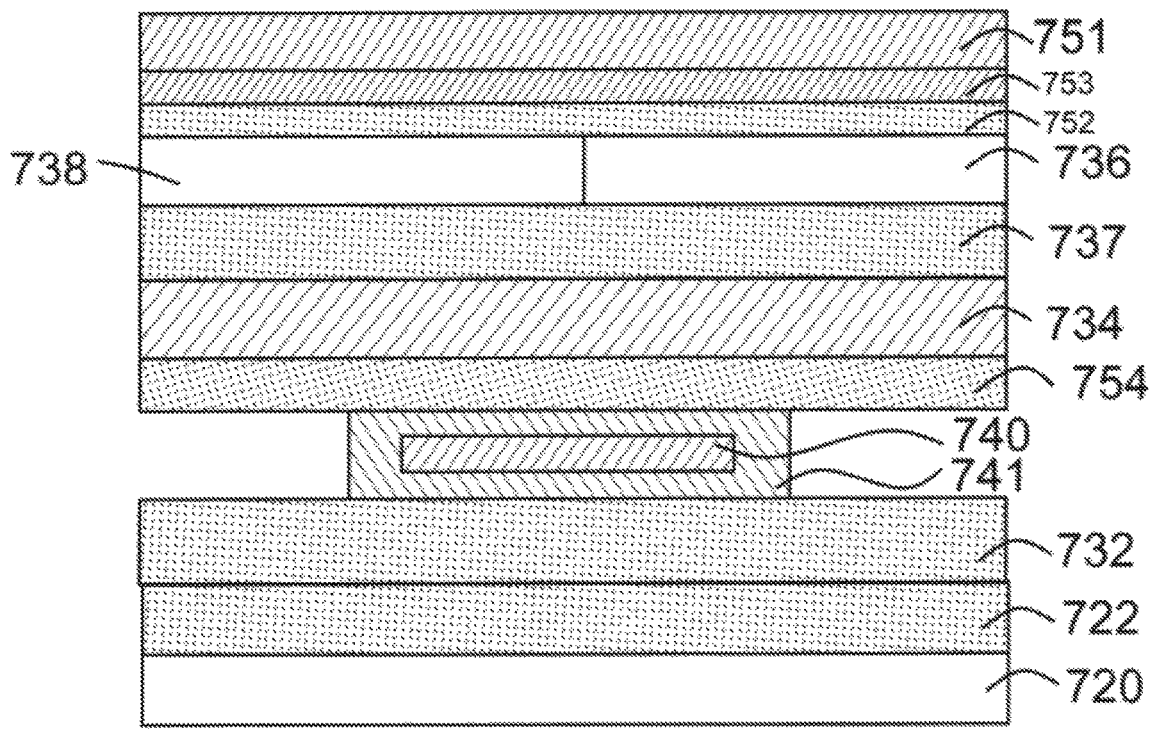
FIG. 11 is a schematic cross-sectional view of the device post production.

FIG. 11 illustrates an alternative embodiment of the inventive device which has been fabricated using a substrate 734 which has been preprinted with human readable and machine-readable information as appears more fully below structure. Carrier sheet 720 may be made of paper or plastic. Layer 720 is treated with a release agent 722 to allow for easy removal of these two layers during application of the device. Layer 732 is a single adhesive layer or combination of stacked adhesive layers which is applied to the surface of the skin when the device is affixed to an individual. Wireless capability may be provided by an electronic component 740, such as RFID chip RFID printed circuit or the like which is encapsulated within a polymeric material 741. Alternative electronic components can comprise RFID, printed circuits and/or a battery, Bluetooth circuitry, nano-circuitry, microchip or flexible circuits and other wireless communication devices. These devices must be safe for skin application. Such considerations include toxicity, safe amounts of potentially harmful materials such as trace metals, nickel and cobalt, and other skin safe variables. Toxic materials can be removed from the design of the electronic component or encapsulation 741 May be made of a material which functions as a barrier. Electronic component 740 can be printed or inserted and allows wireless communication between smart devices and other readers for the purposes of identification, data transmission and, in the case of sensors which are not encapsulated but in direct contact with the skin, extraction of physiologic data.

An adhesive layer 754 allows electronic component 740 and encapsulation 741 to be attached to the substrate 734. Adhesive layer 754 is shown as covering the entire construct, in an alternative embodiment layer 754 can be attached directly to the encapsulation 741 and adhesive layer 754 would only exist on the surface of encapsulation 741.

Substrate layer 734 adds structure and durability to the device and also serves as a platform for which to add the various layers discussed in the structure. A print varnish 737 (or, alternatively a suitable treatment) is applied to promote adhesion of human readable print 736 and machine-readable print 738 to bond well to substrate 734. Layer 736 can comprise visually read data, alphanumerics, illustrations of the like, such as names, date of birth, group identifiers, and color coding. Layer 738 is printed data, which is read using a machine, smart phone or similar device, such as barcodes, QR, datamatrix and other algorithmic designs read by a device capable of extracting the information. In preferred embodiments, layer 736 and layer 738 can be applied by a printing press ideally using flexographic techniques and ultra violet or heat drying processes. The materials used to make up layer 736 and 738 must be skin safe, free from toxicity and fall within the standard guidelines for safe application to the skin. The structure further includes an adhesive layer 752 printed layers 736 and 738 and exposed portions of varnish 737 to an optional micro thin plastic protective layer 753. Micro thin plastic protective layer 753 is covered by a structure providing 751, for example made of paper, for purposes of handling prior to application of the inventive badge to the skin. More particularly, structure providing layer 751 is secured to an optional micro thin plastic protective layer 753 by a very sparse application of adhesive. To apply the inventive badge, carrier sheet 720 and release agent 722 are removed from the structure to expose adhesive 732 which is applied to the skin. Once adhesive 732 is applied, structure providing layer 751 may be removed. This leaves micro thin plastic protective layer 753 to protect the inventive badge and increase its durability. Adhesive 732 and substrate 734 should be durable, comfortable, elastic, safe for skin application, proper moisture vapor handling properties, for example approximately 800+−200 g/m2 over 24 hours. Layer 734 and 753 may comprise polyethylene, polyurethane thermoplastic elastomers and/or other flexible yet durable materials. Adhesive 732 May comprise hydrocolloids, silicones, acrylics, cyanoacrylates and other skin applied adhesives.

An alternative embodiment of the structure of FIG. 11 may be constructed by placing the electronic subassembly comprising components 740 and 741 directly to the surface of the skin, by placing them on the opposite side of adhesive layer 732. In the case of sensors this allows the device to extract physiologic data directly form the surface of the skin. Examples of the data that can be extracted from a sensor on the surface of the skin include glucose levels and temperature.

In an alternative embodiment, multiple layers of adhesive can be used in the structure to increase or decrease the adhesion of components depending on the properties necessary for the final use. All or part of the printed layer 736 and 738 and in the case of printed electronics 740 and 741 can be placed either under or above the substrate layer depending on the intended use. All or part of the electronic layer 740 and 741 can be placed at any level in the construct as long as it does not interfere with the visual elements 736 or the optically read elements 738 data.

The production of the structure of FIG. 11 may be understood from the following description.

Figure 12:
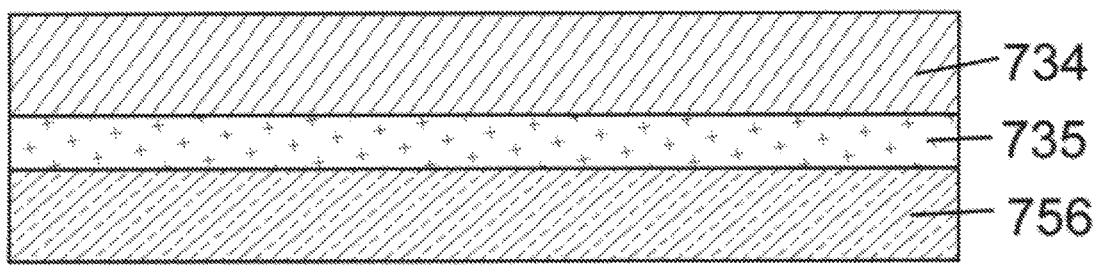
FIG. 12-18 are a schematic cross-sectional view of the production steps of the device.

Production of the structure of FIG. 11 begins with a roll of commercially available material having the structure illustrated in FIG. 12, comprising a carrier sheet made of plastic or paper 756 coated with a release agent 735 two which is adhered to substrate layer 734. In one embodiment the substrate 734 may be perforated prior to further processing resulting in make the finished badge making removal of the finished badge substantially impossible.

Figure 13:
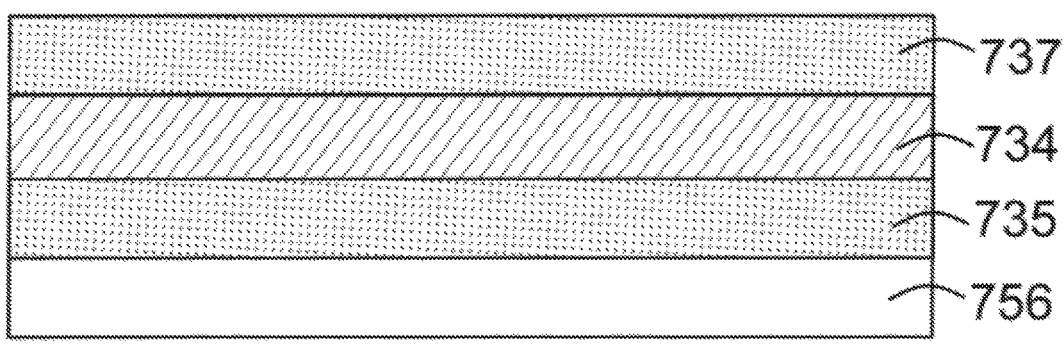

As illustrated in FIG. 13 a layer of print varnish 737 is deposited over substrate 734.

Figure 14:
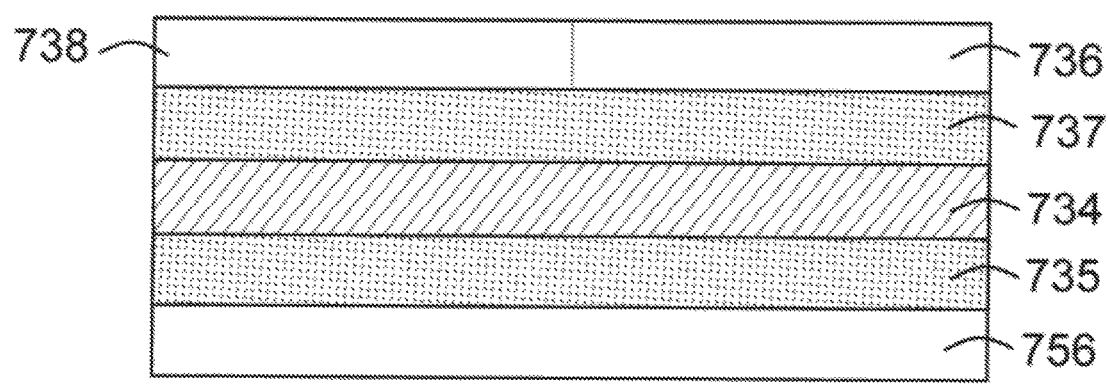

As illustrated in FIG. 14 printed human readable print 736 and machine readable print 738 is next deposited.

Figure 15:
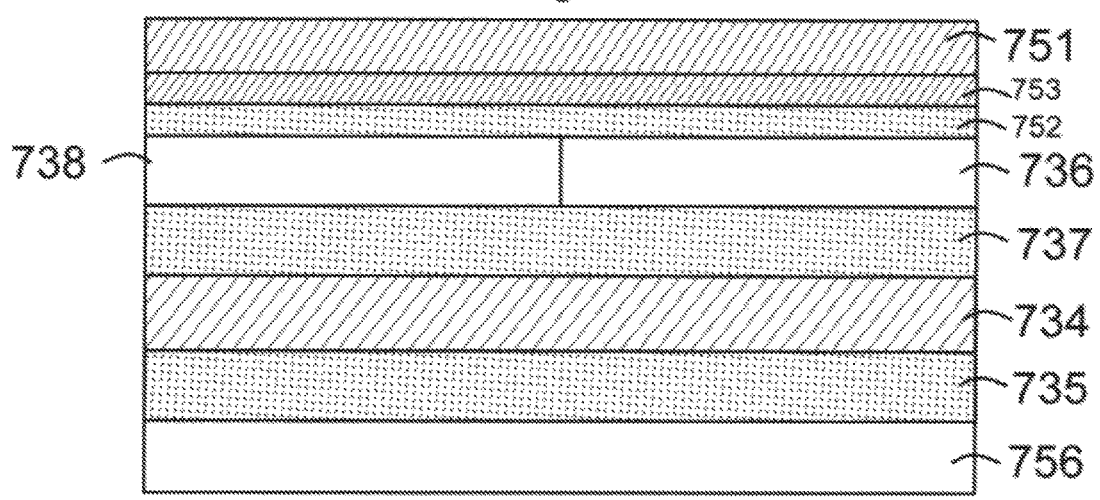

As illustrated in FIG. 15, adhesive layer 752 is then applied over human readable print 736 and machine readable print 738. Micro thin protective layer 753 is adhered to adhesive 752. Finally, the structure is reinforced by adding removable protective layer 751.

Figure 16:
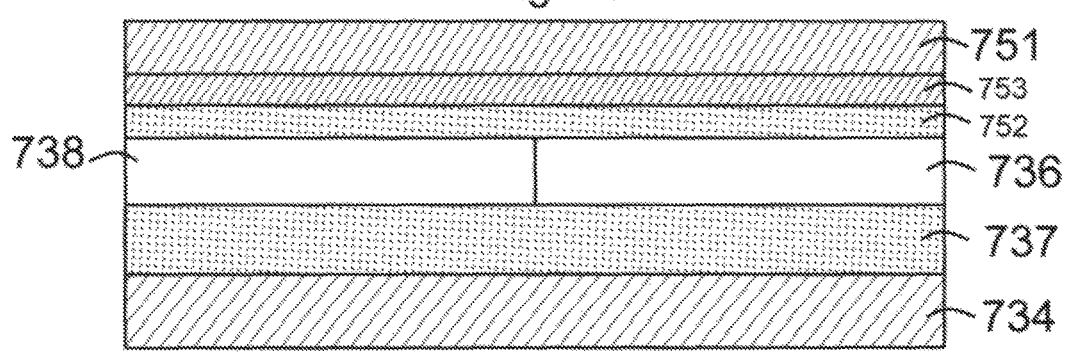

As can be seen from FIG. 16, the next step is the removal of support layer 756 with its layer of release agent 735. This is made possible because of the structure led to the construction by the addition of support layer 751.

Figure 17:
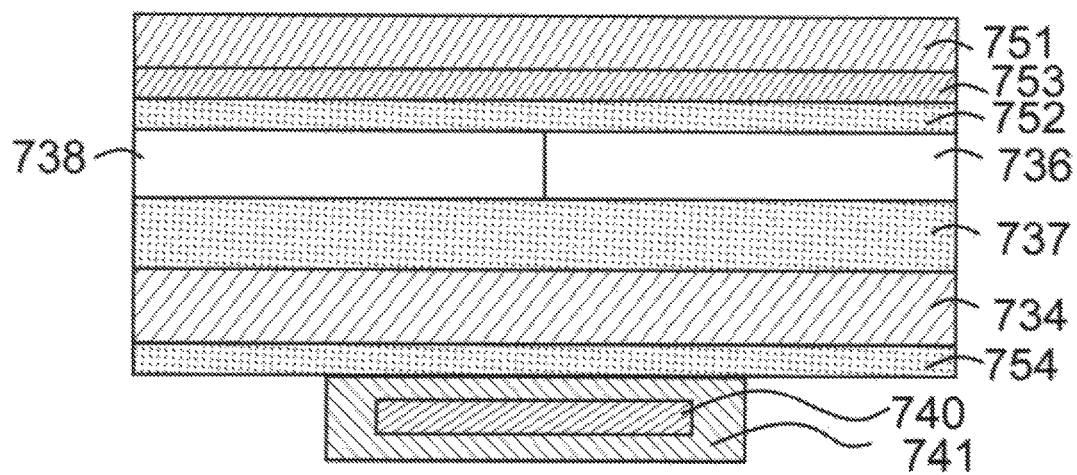

As can be seen from FIG. 17, the next step is the addition of adhesive layer 754, followed by adhesion of encapsulation 741 containing wireless device 740. Alternatively, a wireless component can be printed on or laid into place depending on the application.

Figure 18:
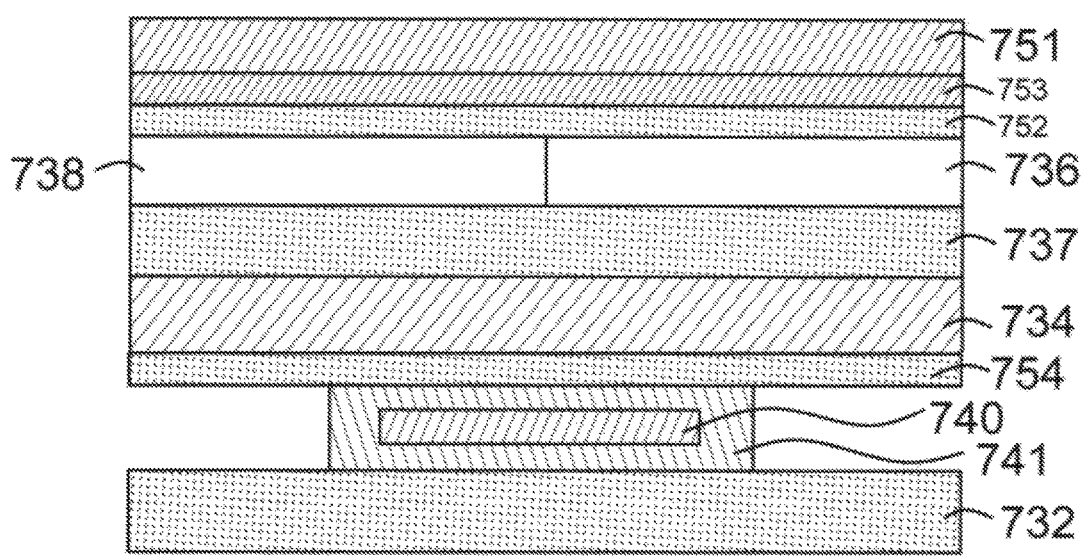

As can be seen from FIG. 18, the next step is the addition of a skin safe adhesive layer 732 which will eventually be the layer that attaches directly to the surface of the skin.

The structure shown in FIG. 11 is then completed by adhering a carrier sheet material 720 with its release agent coating 722 to adhesive 732, protecting all the components and adhesives from the outside elements during handling prior to adhesion to the surface of the skin.

Finished badges may then be die cut into a desired shape from a strip of material having the structure of FIG. 11.

Figure 19:
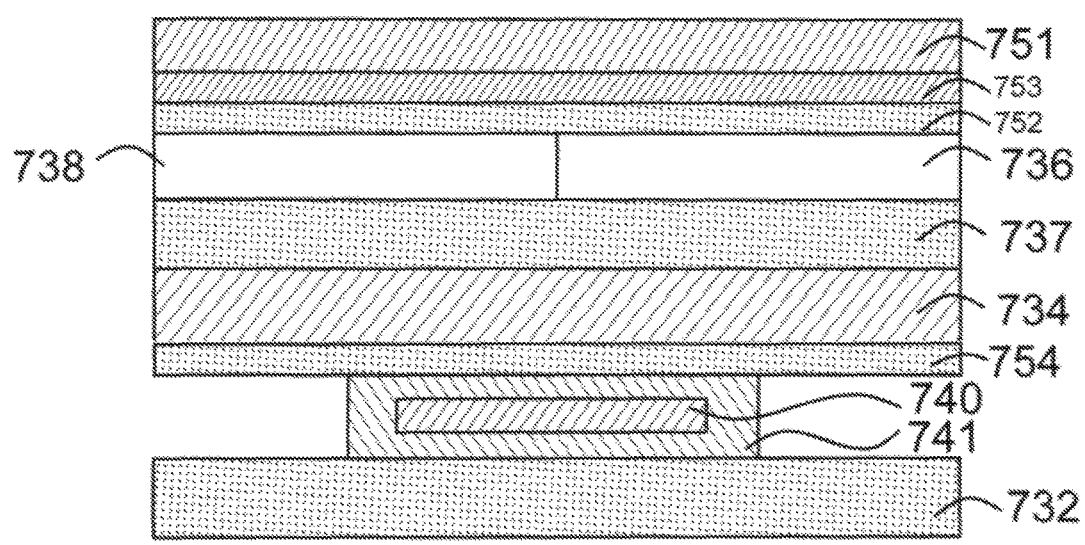
FIG. 19-21 are a schematic cross-sectional view of the application steps of the device.

When it is desired to use the inventive badge, carrier sheet 720 with its release agent 722 are removed resulting in the structure of FIG. 19. In this state, the structure of the device (otherwise substantially unstructured) is maintained by the protective structured layer 751. The inventive badge is then ready for application to the skin.

If desired, the skin may be prepped first to clean the area, and then a primer applied to the skin to aid in the adhesion of the device to the skin.

Figure 20:
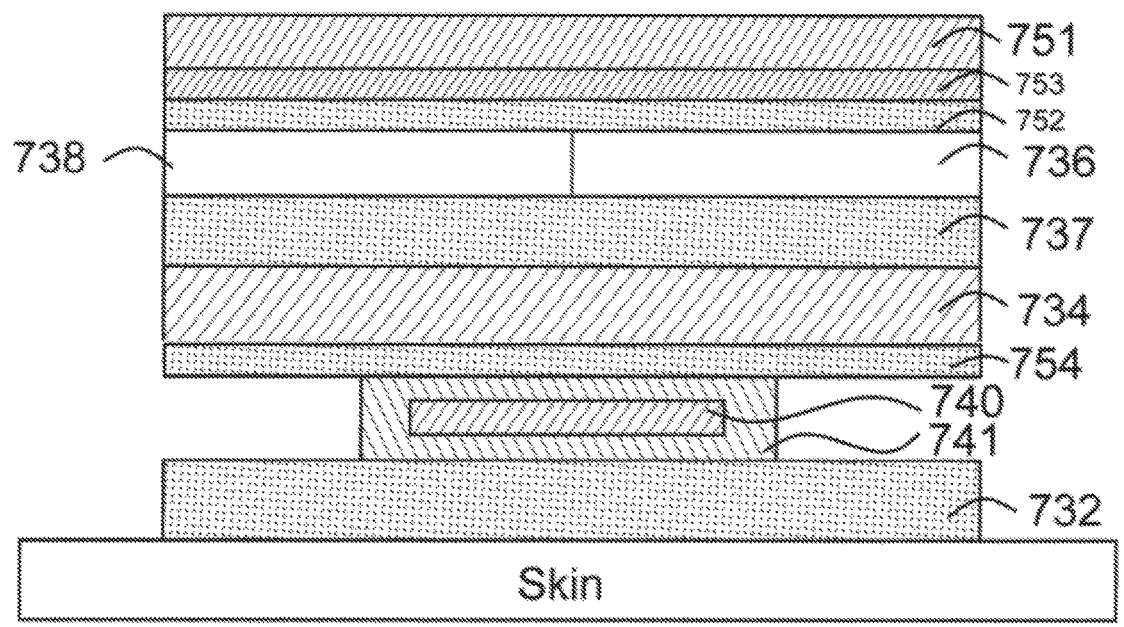

FIG. 20 shows the device after application to the skin.

Figure 21:
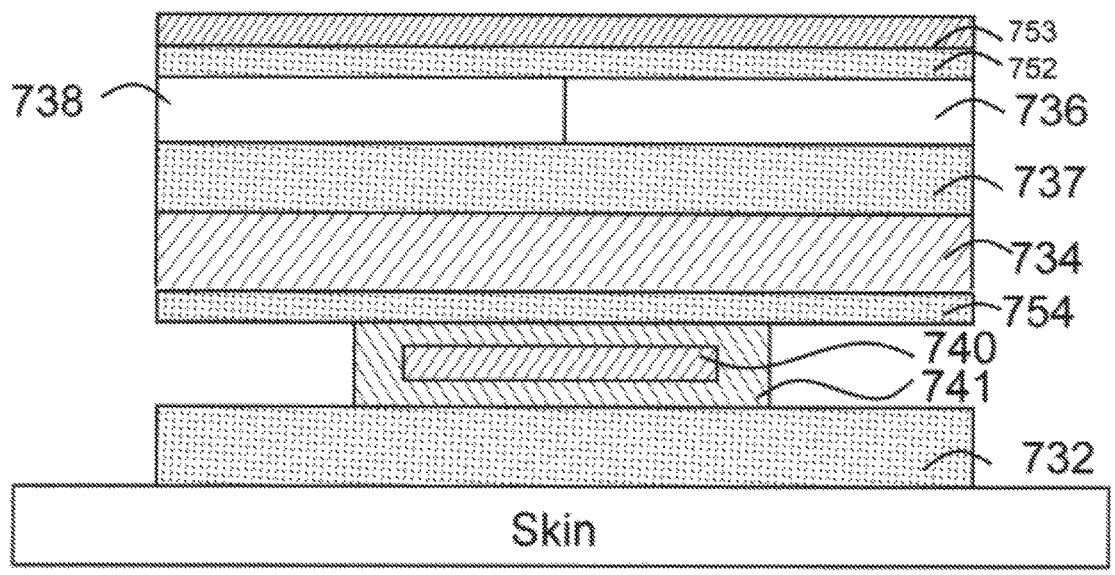

FIG. 21 shows the device at application step 3 with the removal of layer 751. The resulting design is a uniquely novel manufacturing process which creates a durable, frangible, skin applied identification device with visual, optically machine read information and electronic components for security, authenticity, original unique content delivery and physiologic sensing.

Alternative embodiments can include the removal or addition of layers depending on the end use application.

Figure 22:
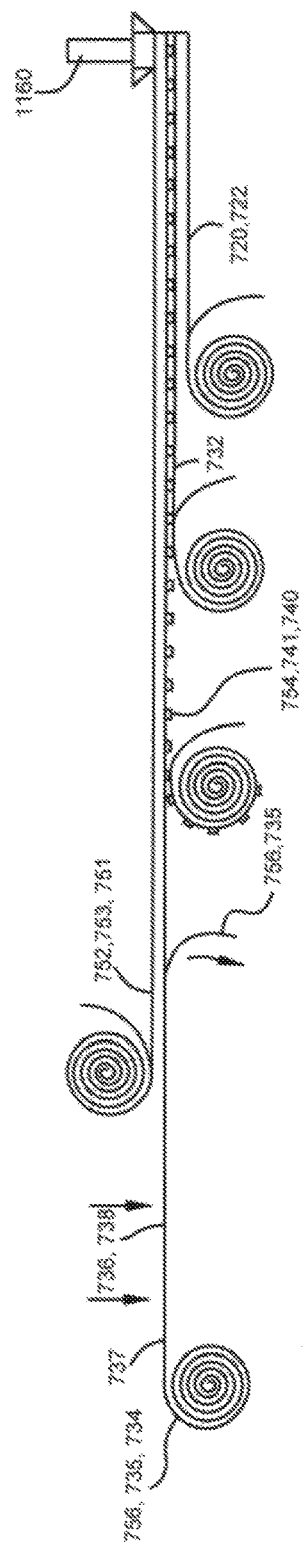
FIG. 22 is the production assembly of the device.

FIG. 22 further outlines the production process in a single continuous line. In practical application this process may require multiple passes through presses and print devices which are not necessarily linked at all times. For simplicity the process is shown in a single step where the production would be done in a single pass. FIG. 22 shows the initial input of the substrate 734, 735, 756 as shown in FIG. 12, the addition of 737 as shown in FIG. 13, the addition of 736 and 738 as shown in FIG. 14, the addition of layer protective structures layer 751 the adhesive layer 752 and the optional thin protective substrate layer 753 as shown in FIG. 15, the removal of layer 756 and 735 as shown in FIG. 16, the addition of layer 754, 741 and 740 shown in FIG. 17, the addition of layer 732 as shown in FIG. 18, the addition of layers 720 and 722 as shown in FIG. 11, the die cutting process 1160 shown in FIG. 22. a unique and novel manufacturing process which creates a durable, frangible, non-transferable skin applied identification device with visual, optically machine read information and electronic components for security, authenticity, original unique content delivery and physiologic sensing.

Figure 23:
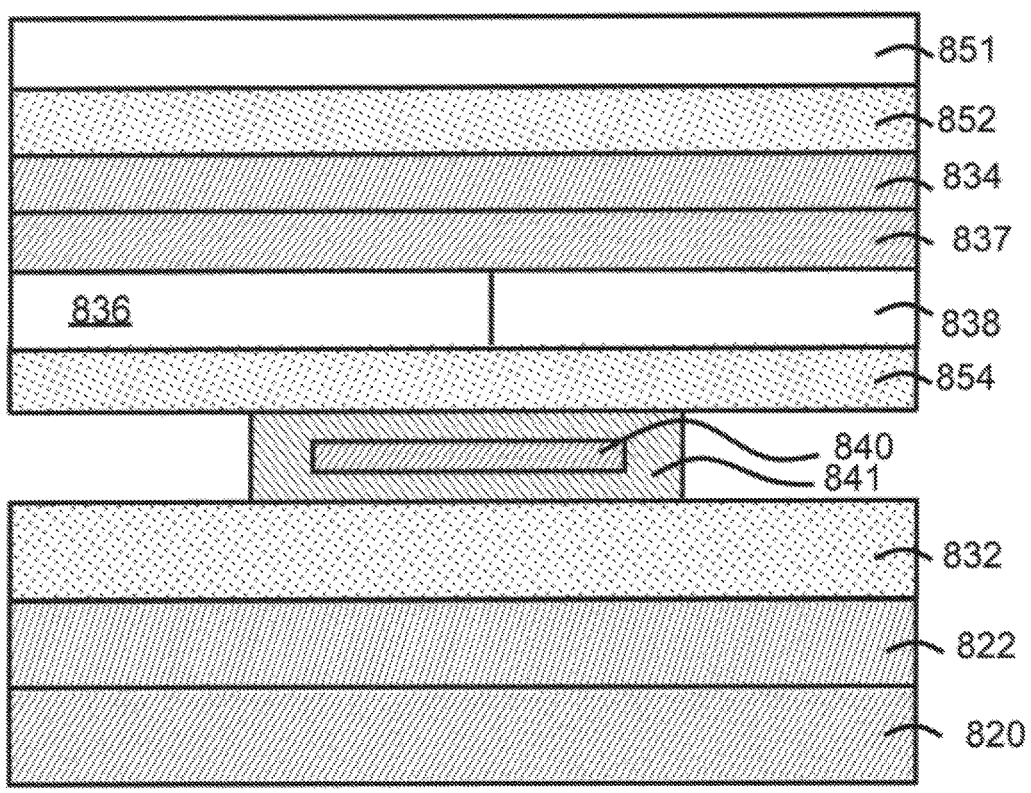
FIG. 23 is a schematic cross-sectional view of an alternative embodiment of the device post production.

FIG. 23 illustrates an alternative embodiment of the inventive device which has been fabricated using a substrate 834 which has been preprinted with human readable and machine-readable information as appears more fully below structure. It is to be understood that FIG. 23 is a diagrammatic representation of a multilevel strip of material, perhaps having a width of about 9 cm and configured in the form of a roll of the material with a length of, perhaps, five meters, substantially in the same manner as the other embodiments illustrated herein. It is contemplated that the roll of material would be diecut to form a plurality of inventive badge applying structures which incorporate badges and have the elements illustrated in FIG. 23. Carrier sheet 820 may be made of paper or plastic. Layer 820 is treated with a release agent 822 to allow for easy removal of these two layers during application of the device. Layer 832 is a single adhesive layer or combination of stacked adhesive layers which is applied to the surface of the skin when the device is affixed to an individual. Wireless capability may be provided by an electronic component 840, such as RFID chip RFID printed circuit or the like which is encapsulated within a polymeric material 841.

An adhesive layer 854 allows electronic component 840 and encapsulation 841 to be attached to human readable print 836 and machine-readable print 838. A print varnish 837 is applied to promote. Layer 836 can comprise visually read data, alphanumeric data, illustrations of the like.

The structure further includes an adhesive friction layer 852 printed applied to substrate layer 834. The friction layer 852 creates a relatively weak bond to protective layer 851, which may be made of paper, for purposes of handling prior to application of the inventive badge to the skin. More particularly, structure providing layer 851 is secured to substrate layer 834 by a very sparse application of adhesive 852. To apply the inventive badge, carrier sheet 820 and release agent 822 are removed from the structure to expose adhesive 832 which is applied to the skin. Once adhesive 832 is applied, structure providing layer 851 may be removed, such as that provided by hydrocolloid adhesives.

An alternative embodiment of the structure of FIG. 23 may be constructed by placing the electronic subassembly comprising components 840 and 841 directly to the surface of the skin, by placing these components on the opposite side of adhesive layer 832.

In an alternative embodiment, multiple layers of adhesive can be used in the structure to increase or decrease the adhesion of components depending on the properties necessary for the final use. All or part of the printed layer 836 and 838 and in the case of printed electronics 840 and 841 can be placed either under or above the substrate layer depending on the intended use. All or part of the electronic layer 840 and 841 can be placed at any level in the construct as long as it does not interfere with the visual elements 836 or the optically read elements 838 data.

Figure 24:
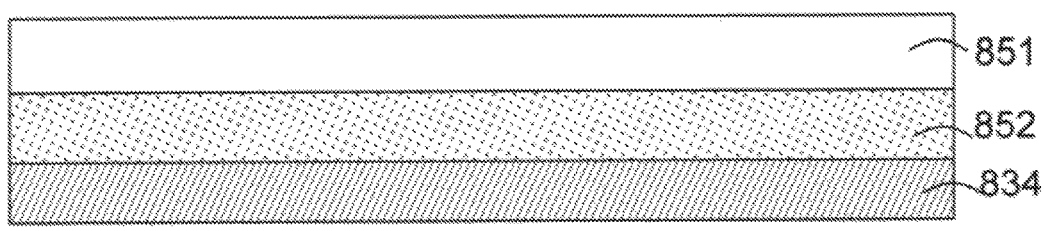
FIG. 24-28 are a schematic drawing of an alternative embodiment of the device detailing various structures and the layers of the device before application.

Production of the structure of FIG. 23 begins with a roll of commercially available material having the structure illustrated in FIG. 24, comprising a carrier sheet made of plastic or paper 851 coated with a release agent 852 with sufficient friction properties to maintain contact with the carrier sheet 851 through the production process. Release agent 852 is adhered a substrate layer 834. In one embodiment the substrate 834 may be perforated to be frangible prior to further processing resulting in making removal of the finished badge substantially impossible.

Figure 25:
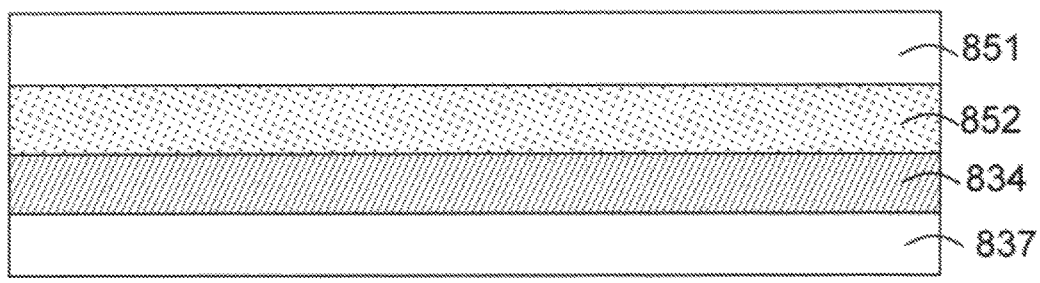

As illustrated in FIG. 25 a layer of print varnish 837 is deposited over substrate 834 to promote adhesion to inks and the like.

Figure 26:
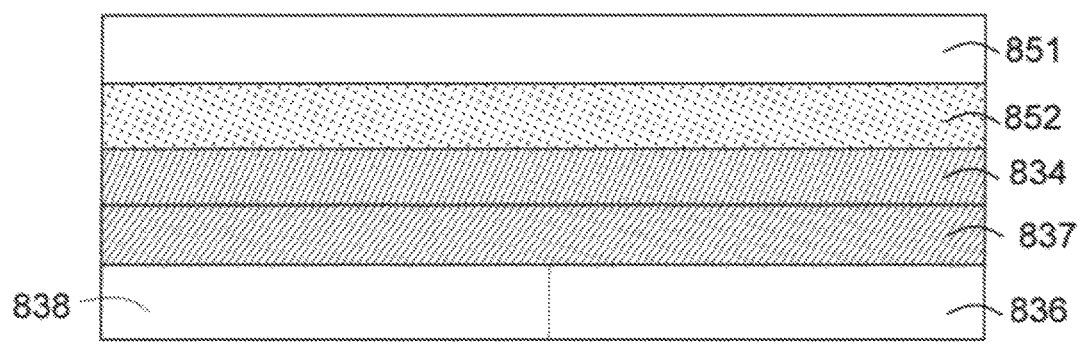

As illustrated in FIG. 26 printed human readable print 836 and machine readable print 838 is next deposited.

Figure 27:
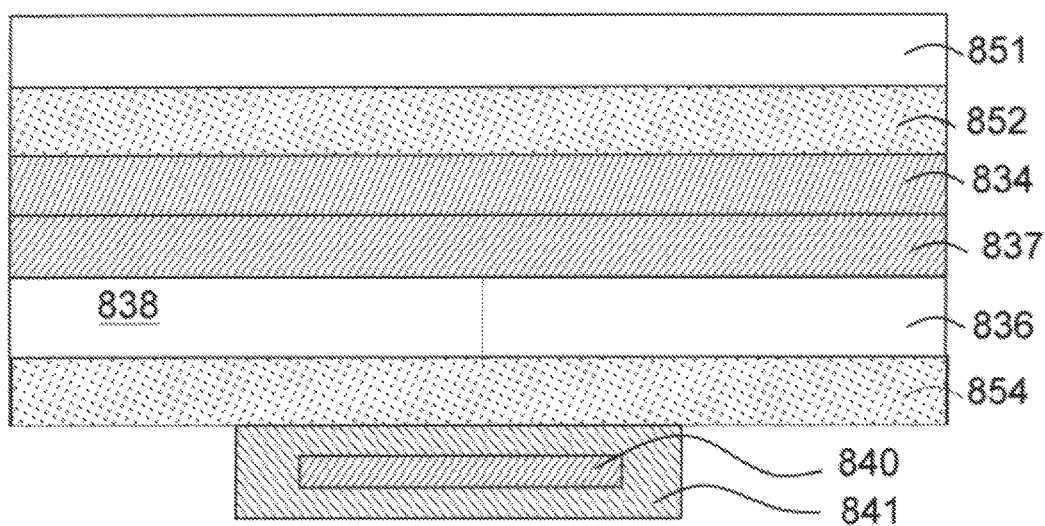

As illustrated in FIG. 27, the next step is the addition of adhesive layer 854, followed by adhesion of encapsulation 841 containing wireless device 840. Alternatively, a wireless component can be printed on or laid into place depending on the application.

Figure 28:
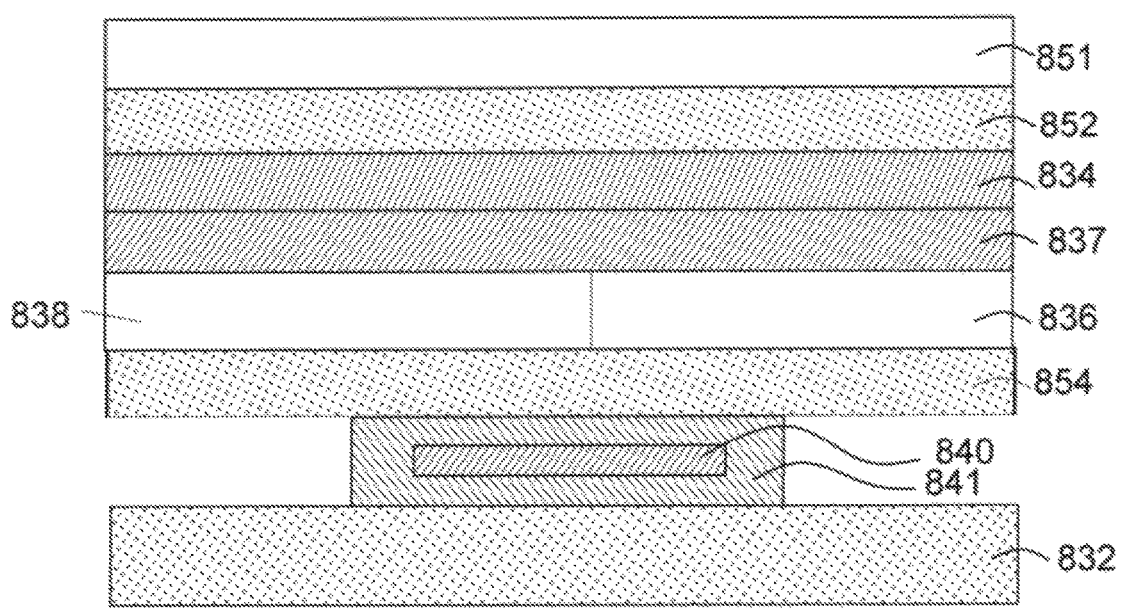

As can be seen from FIG. 28, the next step is the addition of a skin safe adhesive layer 832 which will eventually be the layer that attaches directly to the surface of the skin.

The structure shown in FIG. 23 is then completed by adhering a carrier sheet material 820 with its release agent coating 822 to adhesive 832, protecting all the components and adhesives from the outside elements during handling prior to adhesion to the surface of the skin.

Finished badges may then be die cut into a desired shape from a strip of material having the structure of FIG. 23.

Figure 29:
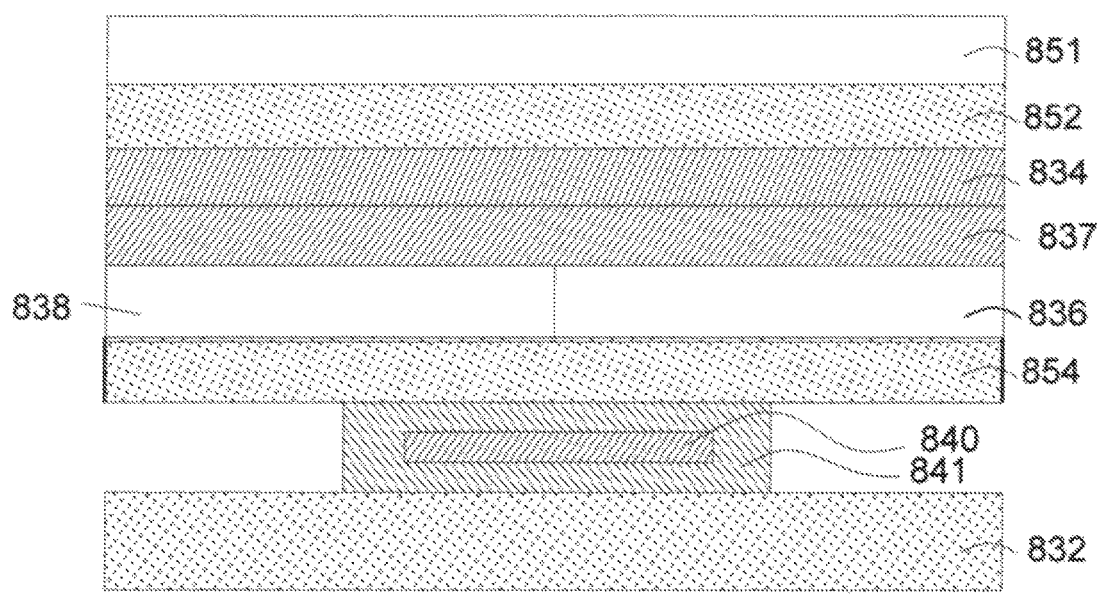
FIG. 29-31 are a schematic cross-sectional view of the application steps of the device.

When it is desired to use the inventive badge, carrier sheet 820 with its release agent 822 are removed resulting in the structure of FIG. 29. In this state, the structure of the device (otherwise substantially unstructured) is maintained by the protective structured layer 851. The inventive badge is then ready for application to the skin.

If desired, the skin may be prepped first to clean the area, and then a primer applied to the skin to aid in the adhesion of the device to the skin.

Figure 30:
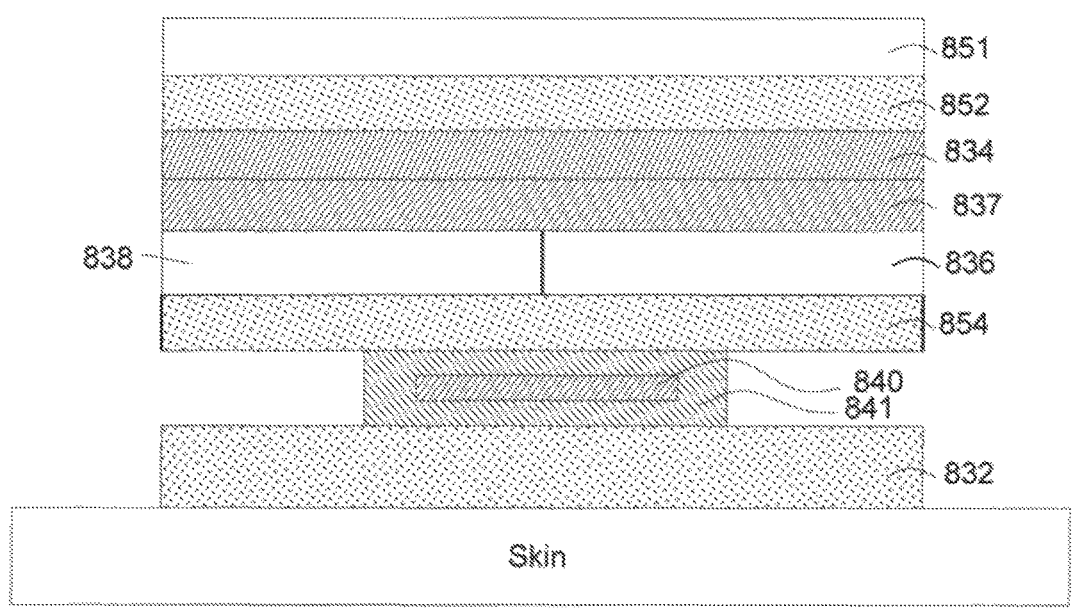

FIG. 30 shows the device after application to the skin.

Figure 31:
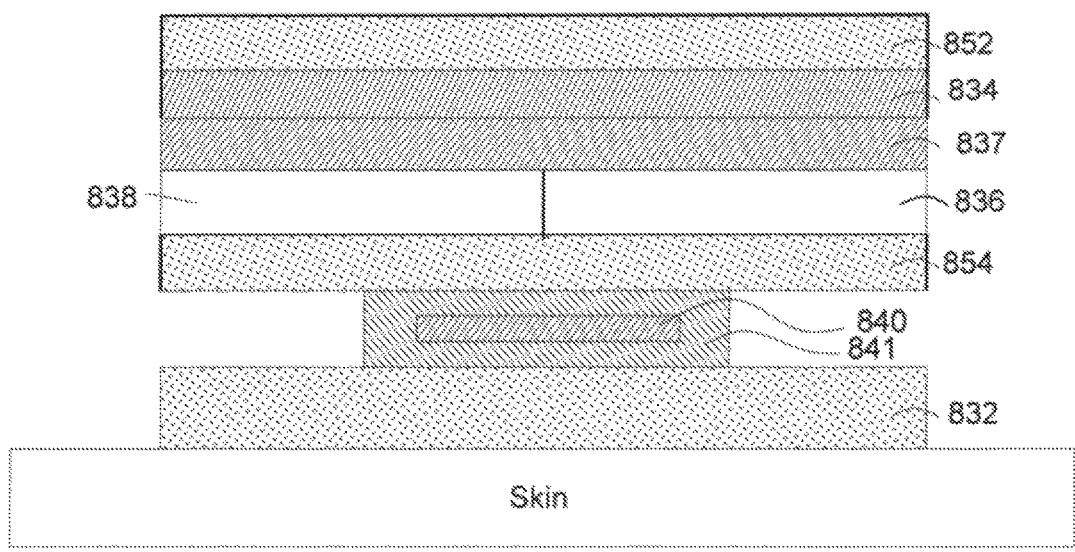

FIG. 31 shows the device after application to the skin and after the removal of structural support layer 851.

Alternative embodiments can include the removal or addition of layers depending on the end use application.

Figure 32:
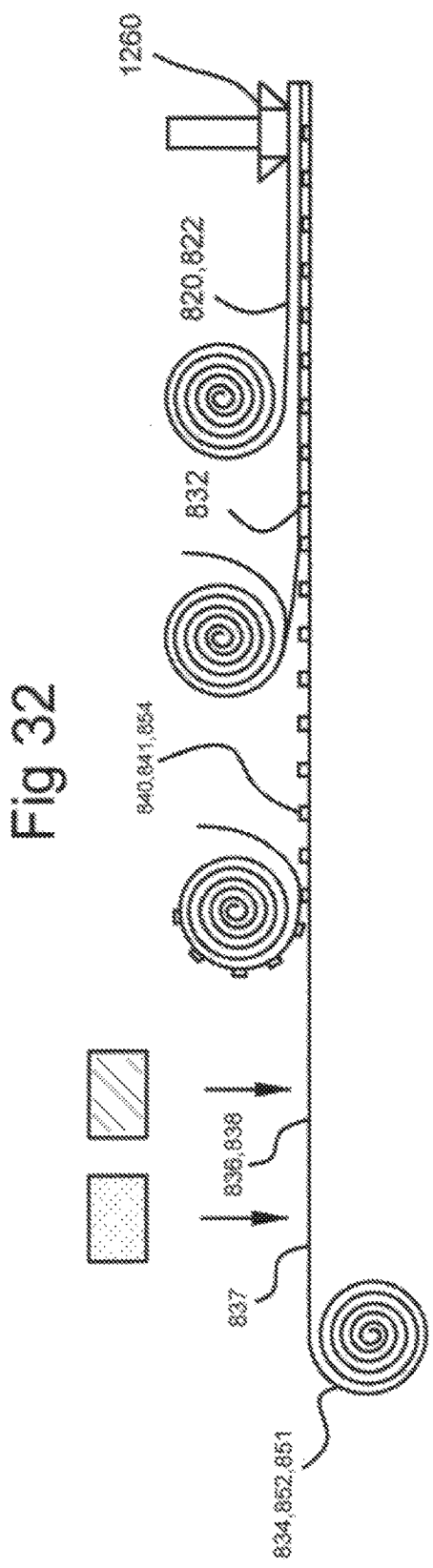
FIG. 32 is the production assembly of the alternative embodiment device.

FIG. 32 further outlines the production process in a single continuous line. In practical application this process may require multiple passes through presses and print devices which are not necessarily linked at all times. For simplicity the process is shown in a single step and in an ideal scenario this would happen in a single pass. Figure shows the initial input of the substrate 834, 852, 851 as shown in FIG. 24, the addition of 837 as shown in FIG. 25, the addition of 836 and 838 as shown in FIG. 26, the addition of 840, 841 and 854 as shown in FIG. 27, the addition of adhesive layer 832 is shown in FIG. 28, the addition of the protective layer and release liner 820 and 822 is shown in FIG. 23 as 820 and 822, the die cutting process 1260 shown in FIG. 32 resulting in a unique and novel manufacturing process which creates a durable, frangible, nontransferable skin applied identification device with visual, optically machine read information and electronic components for security, authenticity, original unique content delivery and physiologic sensing.

FIG. 32 which details preprinted devices in a production environment can allow printing on either side of various substrates including but not limited to polyethylene, polyurethane thermoplastic elastomers and other flexible yet durable materials. The substrate can also be nonwoven materials. In this setting the CID can be prefabricated to allow for printing on either side of the substrate layer and the marrying of various adhesive layers depending on the application. The adhesive could consist of hydrocolloids, silicones, acrylics, cyanoacrylates and other skin applied adhesives. The adhesives and substrate materials are able to manage moisture. The design of the adhesive and the application of the adhesive consists of channels to allow for moisture to escape the construct when applied to the skin.

The unique CID and production processing allows for the device to be printed at point of service to allow for the addition of variable information applied at the time of service. This is particularly useful in environments where the visual or optical information is to be applied at the time of service. This information is collected and applied to the CID in real time.

Figure 33:
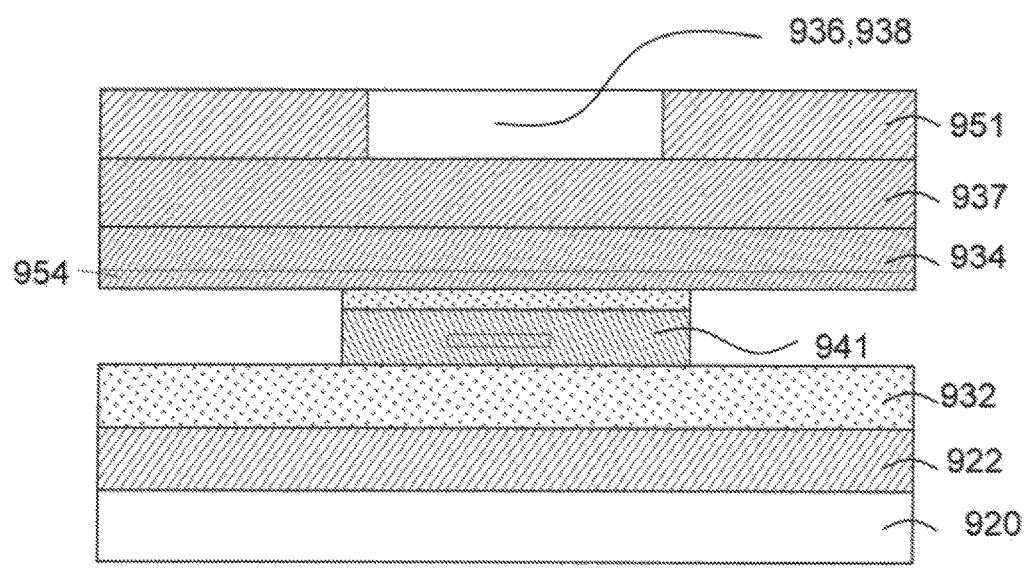
FIG. 33 is a schematic cross-sectional view of the point of service device before it is applied to the skin.

FIG. 33 shows another embodiment of the device structure defined as novel and unique point of service production process and structure. This structure is similar to FIGS. 11 and 23 although it is adapted to address point of service printing and application. For example, there is a gap in the top structured layer 951 to provide a printing window, plus there are various other design considerations to allow this printing process to occur and also to allow the successful application of the device to the surface of the skin as detailed below.

FIG. 33 illustrates an alternative embodiment of the inventive device which has been fabricated using a substrate 934 which has been treated with a print varnish 937 and intentionally left blank to allow, in the regions indicated, the printing of the variable human read data 936 and machine read data 938 at point of service. Point of service is a term used to describe a situation where the data to be applied to the device is not known in advance and must be applied at the time with little or no notice. In the point of service construct of FIG. 33 carrier sheet 920 may be made of paper or plastic. Layer 920 is treated with a release agent 922 to allow for easy removal of these two layers during application of the device. Layer 932 is a single adhesive layer or combination of stacked adhesive layers which is applied to the surface of the skin when the device is affixed to an individual. Wireless capability may be provided by an electronic component 940, such as RFID chip RFID printed circuit or the like which is encapsulated within a polymeric material 941.

An adhesive layer 954 allows electronic component 940 and encapsulation 941 to be attached to a substrate layer 934. A print varnish 937 (or, alternatively a suitable treatment) is applied to promote adhesion of human readable print 936 and machine-readable print 938 which will be applied at point of service to bond well to substrate 934. Varnish 937 will also have friction and adhesive properties suitable to adhere frame 951 to the structure but not too tacky as to cause issue during the desktop point of service printing. Protective layer 920, for example made of paper, is applied for purposes of handling prior to application of the inventive badge to the skin. Protective layer 951 also has a gap which allows point of service printing.

Regions 936 and 938 may receive printed data in the Matre of the previous embodiments.

After point of service data on the end-user is entered into a database, a software program generates the data which will be applied the construct in regions 936 for human readable data and machine readable data region 938. Optionally, a structural and protective layer 971 may be applied over frame 951 to allow printing. To apply the inventive badge, carrier sheet 920 and release agent 922 are removed from the structure to expose adhesive 932 which is applied to the skin. Once adhesive 932 is applied, structure providing layer 971 may be removed. This leaves substrate layer 834 exposed to protect the inventive badge and increase its durability. Adhesive 932 and substrate 934 should be durable, comfortable, elastic, safe for skin application, proper moisture vapor handling properties, for example approximately 800+−200 g/m2 over 24 hours. Layer 934 may comprise polyethylene, polyurethane thermoplastic elastomers and/or other flexible yet durable materials. Adhesive 932 May comprise hydrocolloids, silicones, acrylics, cyanoacrylates and other skin applied adhesives.

An alternative embodiment of the structure of FIG. 33 may be constructed by placing the electronic subassembly comprising components 940 and 941 directly to the surface of the skin, by placing these components on the opposite side of adhesive layer 932. In the case of sensors this allows the device to extract more accurate physiologic data directly form the surface of the skin. Examples of the data that can be extracted from a sensor on the surface of the skin include glucose levels and temperature.

In an alternative embodiment, multiple layers of adhesive can be used in the structure to increase or decrease the adhesion of components depending on the properties necessary for the final use. All or part of the printed layer 936 and 938 and in the case of printed electronics 940 and 941 can be placed either under or above the substrate layer depending on the intended use. All or part of the electronic layer 940 and 941 can be placed at any level in the construct as long as it does not interfere with the visual elements 936 or the optically read elements 938 data.

The production of the structure of FIG. 33 may be understood from the following description.

Figure 34:
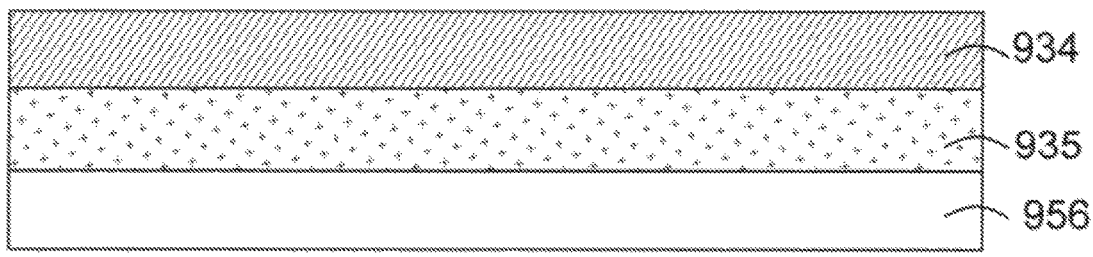
FIG. 34-40 are a schematic cross-sectional view of the production steps of the device.

Production of the structure of FIG. 33 begins with a roll of commercially available material having the structure illustrated in FIG. 34, comprising a carrier sheet made of plastic or paper 956 coated with a release agent 935 which is adhered to substrate layer 934. In one embodiment the substrate 934 may be perforated prior to further processing resulting in making removal of the finished badge substantially impossible.

Figure 35:
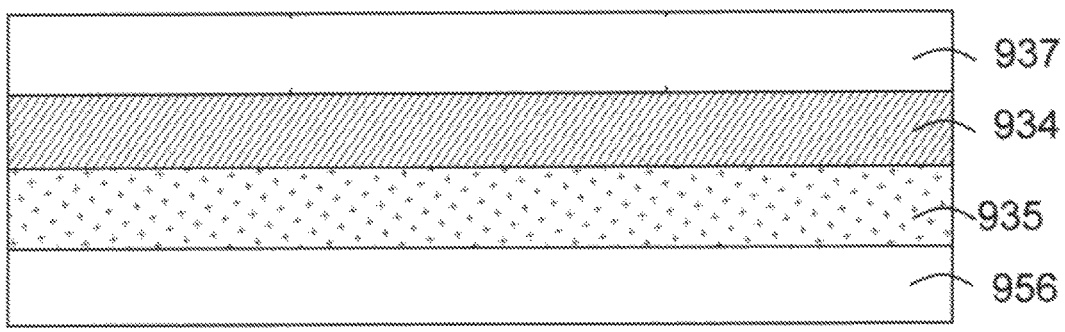

As illustrated in FIG. 35 a layer of print varnish 937 is deposited over substrate 934.

Figure 36:
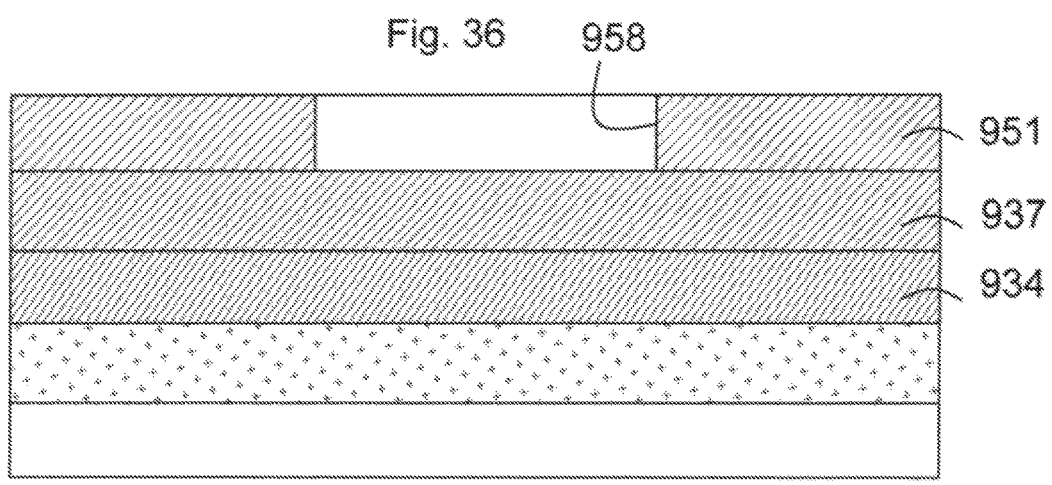

As illustrated in FIG. 36, support layer 951 which defines a frame is next adhered to the construct. Varnish layer 937 also serves as friction layer for the structural layer 951, which has a gap 958 for point of service printing.

Figure 37:
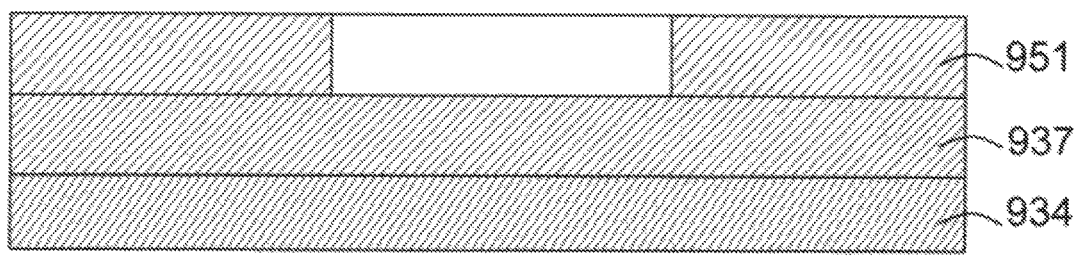

As can be seen from FIG. 37, the next step is the removal of support layer 956 with its layer of release agent 935. This is made possible because of the structure led to the construction by the addition of support layer 951.

Figure 38:
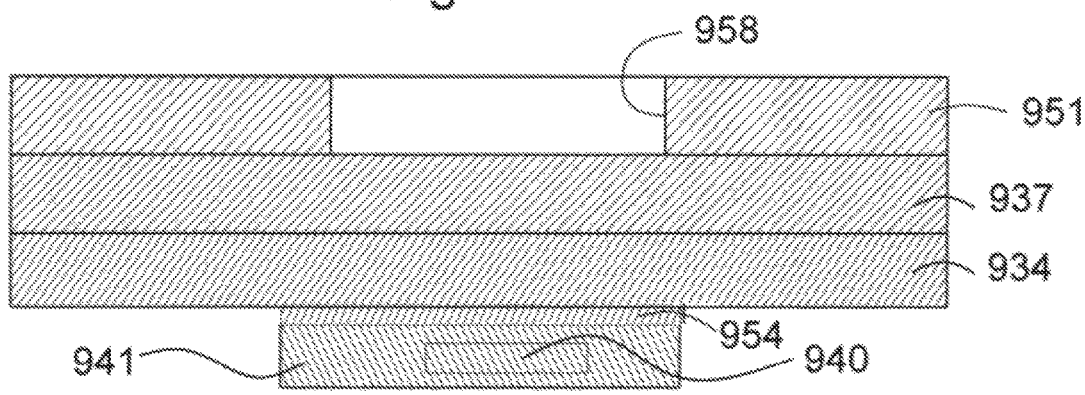

As can be seen from FIG. 38, the next step is the addition of adhesive layer 954, followed by adhesion of encapsulation 841 containing wireless device 840. Alternatively, a wireless component can be printed on or laid into place depending on the application.

Figure 39:
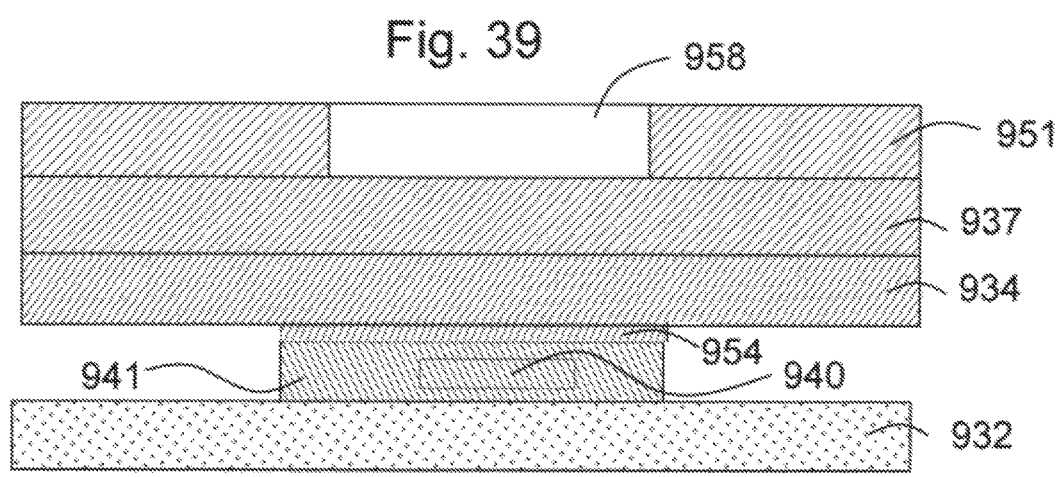

As can be seen from FIG. 39, the next step is the addition of a skin safe adhesive layer 932 which will eventually be the layer that attaches directly to the surface of the skin.

Figure 40:
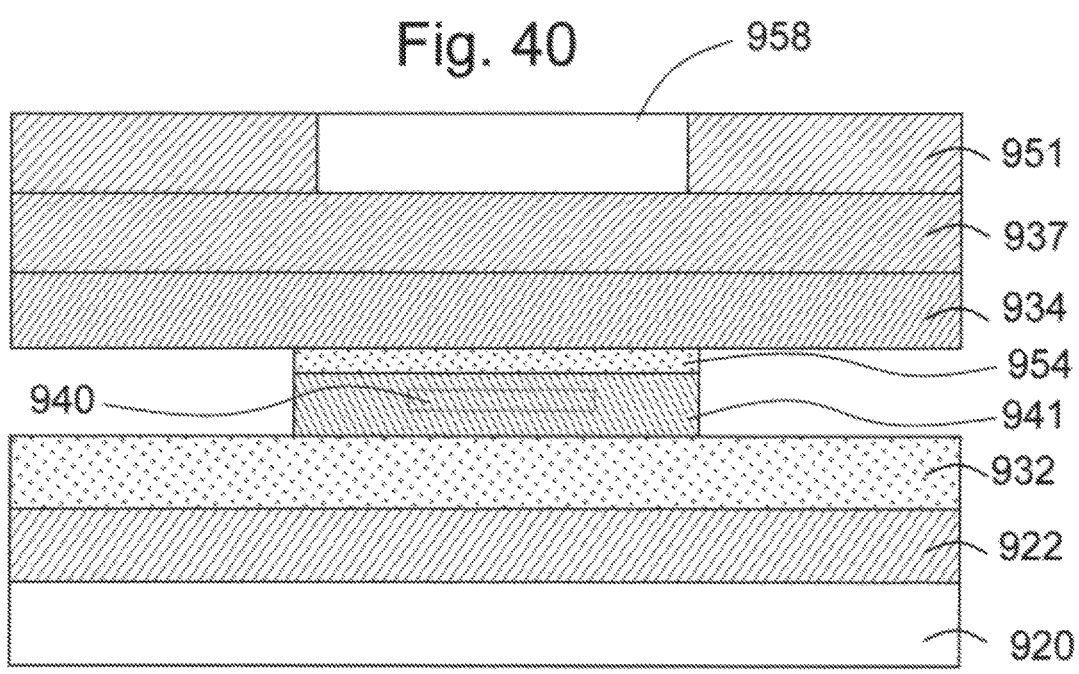

The structure, as shown in FIG. 40, is then completed by adhering a carrier sheet material 920 with its release agent coating 922 to adhesive 932, protecting all the components and adhesives from the outside elements during handling prior to adhesion to the surface of the skin.

Badges may then be die cut into a desired shape by die cutting into a strip of material having the structure of FIG. 33, if optional protective layer 971 is included. Following this, point of service printing will be done after which the badges, which were previously diecut, can be easily popped off the strip.

Figure 41:
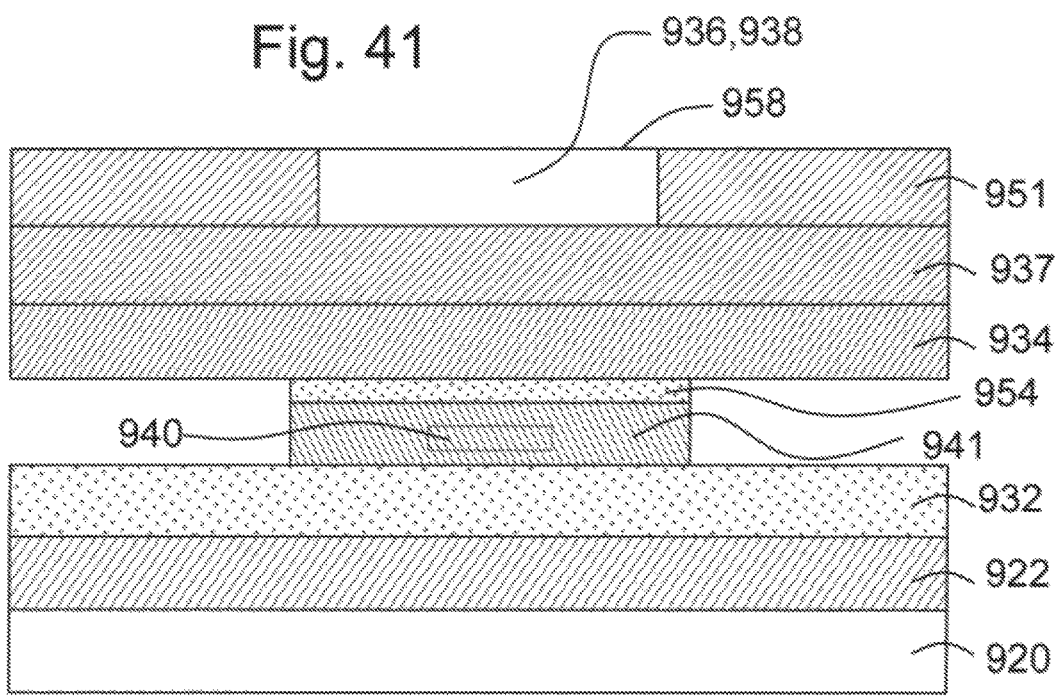
FIG. 41 is a schematic cross-sectional view of the addition of the point of service print material.

As shown in FIG. 41, point of service data is applied to the structure and the regions provided for readable data 936 and machine read data 938 using, for example a desktop printing device.

Figure 42:
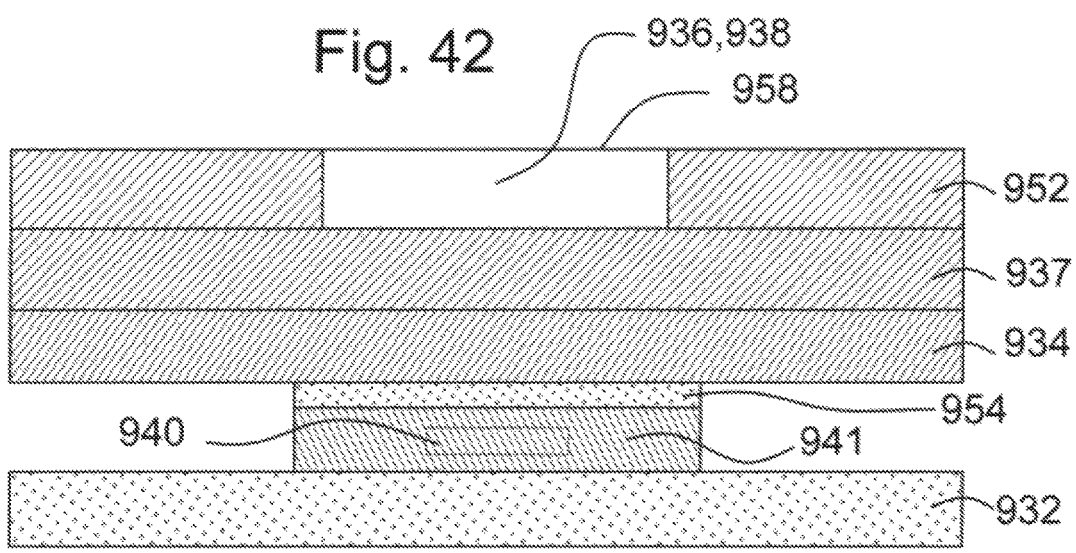
FIG. 42-44 are a schematic cross-sectional view of the application steps of the point of service device.

As shown in FIG. 42, when it is desired to use the inventive device, carrier sheet 920 with its release agent 922 are removed. In this state, the structure of the device (otherwise substantially unstructured) is maintained by the protective structured layer 951. The inventive badge is then ready for application to the skin.

Figure 43:
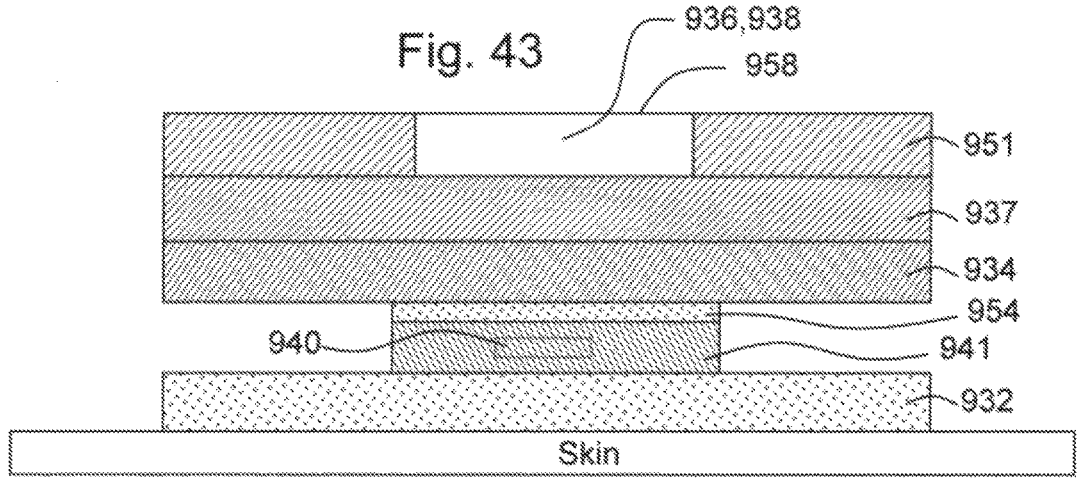

FIG. 43 shows the device after application to the skin.

Figure 44:
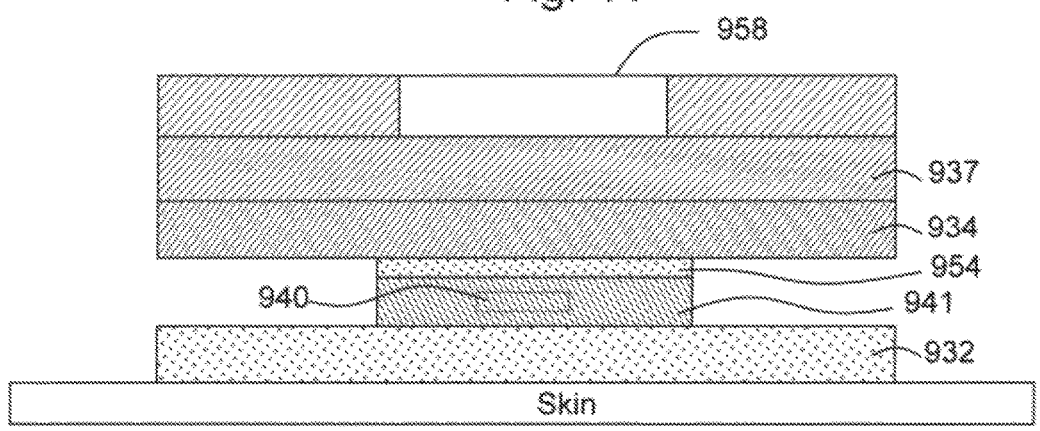

FIG. 44 shows the device after the removal of frame layer 951.

Alternative embodiments can include the removal or addition of layers depending on the end use application.

Figure 45:
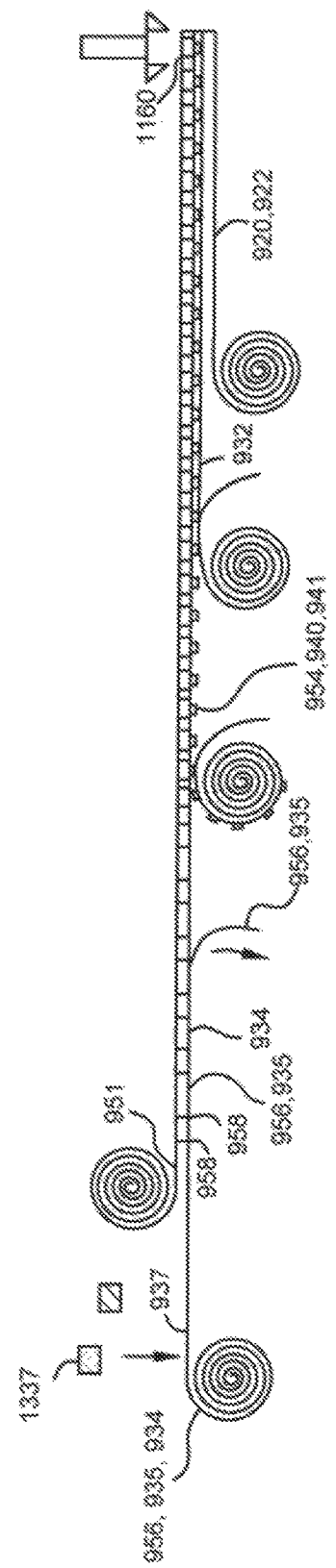
FIG. 45 is the production assembly of the alternative embodiment device.

FIG. 45 further outlines the production process in a single continuous line and describes the production changes necessary to allow for point of service printing. In practical application this process may require multiple passes through presses and print devices which are not necessarily linked at all times. For simplicity the process is shown in a single step and in an ideal scenario this would happen in a single pass. FIG. 44 shows the initial input of the substrate 956, 935, 934 as shown in FIG. 34, the addition of 937 as shown in FIG. 35, the addition of 951 with gap 958 as shown in FIG. 36, the removal of 956 and 935 exposing substrate layer 934 as shown in FIG. 37, the addition of 954, 940 and 941 as shown in FIG. 38, the addition of 932 as shown in FIG. 39 (FIG Z), the addition of 920 and 922 as shown in FIG. 40 (FIG AA), the die cutting process 1360 shown in FIG. 45 and the resulting structure is shown in FIG. 33 with the following layers stacked from the bottom up as 920, 922, 932, 941,940, 954, 934, 937, 951 with gap 958.

This ready to print on structure 1362 is input into a desktop printer. The printer applies a variable data point of service layer visual 936 and machine read 938 as shown in FIG. 41.

In order to print at point of service the ink or toner must meet skin safe standards and the printing process must not damage the device as it goes through the printer.

The resulting product is a unique and novel manufacturing process which creates a production manufactured device ready for point of service printing is a desktop setting resulting in a durable, frangible, nontransferable skin applied identification device with visual, optically machine read information and electronic components for security, authenticity, original unique content delivery and physiologic sensing which is ready to be applied to the surface of the skin.

As shown in FIG. 33 the point of service device in a production environment can allow for the use of various substrates including but not limited to polyethylene, polyurethane thermoplastic elastomers and other flexible yet durable materials. The substrate can also be nonwoven materials. In this setting the CID can be prefabricated to allow for printing on either side of the substrate layer and the marrying of various adhesive layers depending on the application. The adhesive could consist of hydrocolloids, silicones, acrylics, cyanoacrylates and other skin applied adhesives. The adhesives and substrate materials are able to manage moisture. The design of the adhesive and the application of the adhesive consists of channels to allow for moisture to escape the construct when applied to the skin.

In another embodiment a combination of processes shown in the series of FIGS. 22 32 and 45 can be used to create the desired product for the end user.

To allow for point of service printing, the CID must have a white or some other contrasting color as a background for printing to allow data to be read by machines or persons using the badge. This may be done by using a white material, such as white polymeric material for paper for the member which is receiving print. Alternatively, a layer of white pigment may be printed to achieve contrast, as is possible with at least one commercially available desktop printer.

The production process for producing a CID may involve flexographic printing in combination with commercial presses and dye cutting machinery to produce a ready to apply CID. For a preprinted ready to apply CID, a flexographic printer lays skin safe ink onto either side of a substrate layer. The substrate layer is flexible, comfortable, durable with appropriate moisture handling properties. To have the same or similar soft and flexible properties as human/animal skin (advantageous for comfort), a structured layer attached the substrate to allow it to mechanically be pulled through the printed press is useful.

Figure 46:
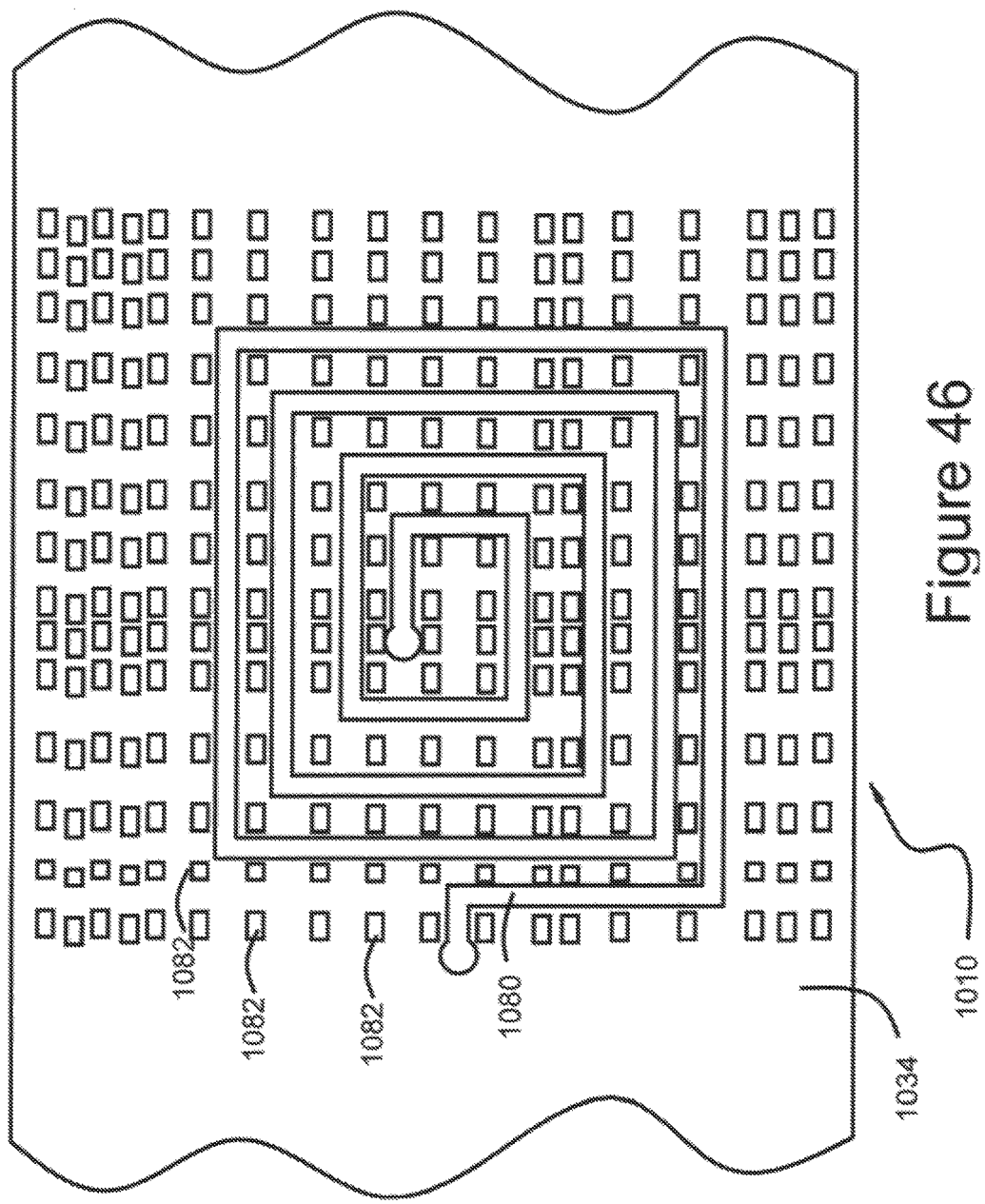
FIG. 46 illustrates a badge assembly with perforations in accordance with the present invention.

For security applications, to prevent the CID from being transferred a perforation process may be done on the press to prevent the substrate from being removed in a single piece after applied to the end users skin. FIG. 46 shows such a structure in which a strip of white polymeric substrate material 1010 forms a polymeric substrate 1034. Substrate 1034 carries, for example, an RFD antenna coil 1080 and numerous perforated holes 1082, which are punched into substrate 1034, being careful to avoid the conductive structure of RFD coil 1080. The presentation of multiple perforated holes 1082, for example on opposite sides of the conductive structure of the RFD coil or any conductor in a wireless device will render that device particularly frangible. In accordance with the invention, it is contemplated that electrical circuitry, such as antenna coil 1080 would comprise a fragile metallic foil, printed or spray-painted conductive paint, or any limited strength conductive member which when subjected to forces beyond its threshold will break, preventing the conductor of electricity and disabling the wireless device, such as an RFD coil.

Using flexographic printing techniques a printed layer is applied to a substrate with no adhesive. The next step is to apply the noncontact communication device such as RFID, printed circuit or battery, Bluetooth, nano-circuitry microchip or other non contact communication device. The noncontact device (RFD for example) should be flexible enough to be comfortable on the skin. As the same time, the device must be frangible to prevent surface to surface transfer and also as a security protocol to prevent the RFID from being removed from one person and applied to another. The materials that come into contact with the skin must be biocompatible.

The noncontact communication device is applied to a structured layer, laser cut to remove any excess material and coated with a release layer to allow the chip to be transferred to the CID construct. The chip can be coated with an adhesive layer to assist inserting the chip into the CID construct. The chip also has frangible properties which does not allow the chip to be removed from one person to another and still function. This frangibility is created by purposefully designing weak spots in the chip to prevent the chip from maintaining its structural integrity when stresses are put on the material non consistent with tensions that exist when the device is applied to the skin. When the device is removed from the surface of the skin.

The present invention contemplates a secure frangible skin applied device that is purposefully designed to break apart visually, optically and mechanically when removed from the original person the device is applied to making it substantially nontransferable.

In accordance with the invention, die cutting is done before or after applying the carrier sheet. If done before a simple die cut process is used to cut the entire construct into the appropriate shape. If the die cutting is done after the carrier sheet is applied than a process known as kiss-cutting is used to cut through the all the layers of the CID, but not the backing layer, of allowing a badge to be removed leaving the backing behind. In accordance with the invention, it is also contemplated that a plurality of badges, for example, badges held on a carrier sheet of standard 8.5×11" paper, for example a matrix of 20 badges comprising four columns and five rows of badges could be manufactured as an alternative to a strip of badges. This approach would allow the same to be printed on a standard desktop printer.

On this embodiment the original structural layer is clear and the final product consists of the clear sheet, the various layers of the CID and a carrier sheet treated with a release agent. This clear layer allows the user to see what is being applied to the skin. The kiss-cut then allows the CID to removed from the carrier sheet and the rigidity of the CID is maintained by the clear structural layer. The adhesive is applied to the skin and the clear structural layer is removed.

The resulting novel product is a purposefully designed ready to apply frangible CID that is nontransferable secure and durable with skin safe adhesive, skin safe ink, visually, optically and noncontact machine read devices and a protective outer layer.

In another embodiment the chip is placed between the adhesive layers

In another embodiment the chip is placed in the CID construct last so the chip is in direct contact for the skin. This location allows for the chip to pull data from the surface of the skin to measure physiologic properties such as temperature and glucose.

As can be seen from the above, manageability can be incorporated into the device, substrate, and/or RFID, and preferably all of these elements to the extent practical.

In another embodiment the substrate used in the first step has adhesive applied to one side. The adhesive and substrate sit on a carrier sheet that is treated with a release agent. Using flexographic printing techniques a printed layer is applied to a substrate layer that is exposed. The substrate layer is then treated with an agent to allow for a structured layer to be applied to the area that was just printed on. Since the substrate is flexible and elastic it must always have a structured layer attached to it. The next step of the process is removing the substrate from the carrier sheet to apply the additional layers. To do this the printed area must be treated to create a bond between the structured layer being added to the printed layer. Once this structured layer is applied and the bond is complete the system can then remove the original structured layer while still maintaining the integrity of the substrate and ink.

In accordance with the invention, an ideal wireless device (for example an RFID) is flexible to allow comfort on the skin, frangible to enable a security protocol to prevent the RFD from being removed from one person and applied to another the entire device must meet skin applied specifications (trace metals such as nickel and cobalt).

Ideally, the device should also be compatible with MRI systems, so that patients can use the inventive badge on a continuous basis.

The noncontact communication device may be applied to a structured layer, laser cut to remove any excess material and coated with a release layer to allow the chip to be transferred to the CID construct. The chip can be coated with an adhesive layer to assist inserting the chip into the CID construct. The chip also has frangible properties which does not allow the chip to be removed from one person to another and still function. This frangibility is created by purposefully designing weak spots in the chip to prevent the chip from maintaining its structural integrity when stresses are put on the material non consistent with tensions that exist when the device is applied to the skin. When the device is removed the from the surface of the skin.

Variable printed data can be applied to the inventive badge using a variety of printing techniques including inkjet, laser, sublimation, thermal etc. The inks or toners must, for human use, be safe in contact with the skin and the printing process must not damage the CID before application Ideally, inkjet ink which is free of toxic ingredients must be used. Water based inks or solvent based inks can be used based on the properties of the substrate. In the case of laser printing the materials of which the inventive badge and the associated construct carrying it must be able to withstand the heat of the fuser roller which can range from 160-170 degrees Celsius.

In order to be able to print using standard printers the area needed for printing must be exposed prior to being exposed to the print head. This is done in a variety of ways.

For example, during the production process the outermost structured layer will have a gap allowing for the printer to access the print area. During the production process an additional inkjet or toner varnish layer is added to increase the ability of the ink droplets to be displayed properly and dry appropriately. Corona treatment or an air plasma treatment is used to change the property of the surface, for example a polymeric surface, and allow for the ink to bind to the substrate and dry appropriately.

The production process provides a protective sheet covering the device and all gaps. A first protective sheet is removed exposing the print area surrounded by a geometric frame. The page is input to the printer, the variable information is printed and the resulting product is a ready to apply shield with a geometric frame to create the rigidity useful for handling and to apply the shield. The geometric frame is die cut using a kiss-cut to allow the geometric frame and the entire CID device to be removed from the carrier sheet and applied to the skin. Once affixed to the skin the geometric frame is removed and discarded leaving just the CID on the device.

The inventive badge can be provided in roll, multiple badge sheet and individual badge formats, all of which can be used in a wide range of printers.

For point of service printing the outermost layer may have all the static colors preprinted with contrasting background to allow for the variable data to be visibly printed at point of service.

One of the methods of effectuating frangibility in accordance with the invention is to also have manufactured weak points. More particularly, if the device is removed from the individual, critical components will fracture and thus prevent the device from functioning. For example, the antenna associated with the circuit in an RFID device may comprise a spiral shape metal foil disposed on a perforated substrate which easily reps under the application tension, thus separating the metal foil antenna into two or more sections, thus destroying its operability. Making the inventive device difficult or impossible to remove while preserving functionality gives the benefit of making the system employing the device more secure.

Applications of the present invention include academics events at any level, recreation, scouting, fairs, concerts, sporting events, hotel and travel, healthcare, religious events, mass gatherings, parks targeting children, amusement parks, zoos, public events, political events, rallies, parades, holiday events, prisons, prison transfer, morgue, funeral homes, and anywhere where secure durable, temporary identification or authentication is functionally beneficial as discussed in the disclosures incorporated by reference.

While illustrative embodiments of the invention have been described, it is understood that various modifications will be obvious to those of ordinary skill in the art. Such modifications are within the spirit and scope of the invention, which is limited and defined only by the appended claims.

What is claimed:

1. A badge comprising: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible, wherein said wireless device comprises an RFID device, said RFID device comprises a conductive member disposed on an RFID substrate, said RFID substrate defining perforations to promote frangiblity, pairs of said perforations being disposed on opposite sides of said conductive member facing relationship to eachother whereby any attempt to remove the badge results in applying stress to that portion of the conductive member between facing perforations.

2. A device for applying a badge to the skin of a person, wherein the badge comprises: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible, further comprising a frame member adhered over said topside, said frame member being robust enough to provide stiffness and support sufficient to reduce the likelihood of rupturing frangible portions of said badge.

3. A badge as in claim 2, wherein frangiblility, upon the application of mechanical stress said badge results in the badge breaking apart electrically, optically and mechanically.

4. A device as in claim 2, wherein said adhesive is a hydrocolloid adhesive.

5. A device as in claim 2, further comprising a protective layer disposed over said top side of the badge.

6. The device according to claim 2 wherein the substrate in combination with the adhesive is substantially impermeable to water and is breathable allowing some water vapor to pass through said combination.

7. A device for applying a badge to the skin of a person, wherein the badge comprises: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible, wherein said substrate is thin enough to be frangible without perforations, and further comprising a frame member adhered over said top side, said frame member being robust enough to provide stiffness and support sufficient to reduce the likelihood of rupturing said substrate.

8. A badge comprising: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible further comprising a windowed frame overlying said top side, allowing the application of said visually discernible material after assembly of said badge.

9. A device, wherein a plurality of badges are contained on a single piece of substrate, and the operative badge portions of the device are kiss cut without cutting said substrate to allow removal of a badge while leaving said substrate behind after removal of said operative badge portions, wherein each badge comprises: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible.

10. A method of manufacturing a device comprising a badge, comprising assembling the operative elements of the device on a manufacturing assembly substrate which allows the operative elements of the device which are frangible to go through the manufacturing process substantially without damage, and wherein said manufacturing assembly substrate may be removed prior to use wherein the badge comprises: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible.

11. A method of manufacturing a device comprising a badge as in claim 10, wherein assembly is performed by feeding to the manufacturing assembly substrate successive operative elements of the badge assembly from rolls comprising a operative element support strip adhered to a plurality of each of the operative elements, causing it to be adhered directly or indirectly to the manufacturing assembly substrate while peeling away the operative element support strip.

12. A method of manufacturing a device comprising a badge as in claim 11, wherein at least some of the operative elements of the badge assembly are created using a process selected from the group comprising printing, silkscreening, brushing on, stamping and rolling on.

13. A system, comprising a badge together with a plurality of portable electronic communication devices for wirelessly reading the first information within said wireless device and/or optically scanning and reading said third information encoded by said second portion of visually discernible material and or for receiving and transmitting user inputs from the users of said portable electronic communication devices, a network for receiving said first and third information from said plurality of electronic devices, and a computer coupled to said network to receive said first information, said third information, and said user inputs, said computer including nonvolatile storage means having stored there on computer software for controlling said computer and causing said computer to store said first information, said third information and said user inputs, to analyze said first information, said third information and said user inputs to generate database and control information, and to communicate said database and control information over said network to control electronic systems and/or make information available to users on said portable electronic communication devices wherein the badge comprises: (a) a substrate with (i) a top side, and (ii) a bottom side; (b) an adhesive disposed on the bottom side for adhering the badge to a person; (c) a visually discernible material disposed on the top side for providing information; and (d) a wireless device carrying first information secured directly or indirectly to said substrate; wherein said visually discernible material comprises a first portion of visually discernible material and a second portion of visually discernible material, wherein (i) said first portion of visually discernible material being positioned, configured and dimensioned to communicate humanly perceptible and humanly readable second information; and (ii) said second portion of visually discernible material carrying third information encoded within said second portion of said visually discernible material and being positioned, configured and dimensioned to be scanned by an optical device in order to the read said third information encoded within said second portion of said visually discernible material, wherein said substrate and/or said wireless device is frangible.

14. The system as in claim 13, wherein the wireless device is program to be accessible only to portable electronic communication devices with an approval code in an application downloaded to such portable electronic communication device.

* * * * *